United States Patent [19]
Kordonsky et al.

[11] Patent Number: 5,577,948
[45] Date of Patent: *Nov. 26, 1996

[54] MAGNETORHEOLOGICAL POLISHING DEVICES AND METHODS

[75] Inventors: William I. Kordonsky; Igor V. Prokhorov; Sergei R. Gorodkin; Gennadii R. Gorodkin; Leonid K. Gleb; Bronislav E. Kashevsky, all of Minsk, Belarus

[73] Assignee: Byelocorp Scientific, Inc., Rochester, N.Y.

[ * ] Notice: The term of this patent shall not extend beyond the expiration date of Pat. No. 5,449,313.

[21] Appl. No.: 525,453

[22] Filed: Sep. 8, 1995

Related U.S. Application Data

[63] Continuation of Ser. No. 71,813, Jun. 4, 1993, Pat. No. 5,449,313, which is a continuation-in-part of Ser. No. 966,919, Oct. 27, 1992, abandoned, which is a continuation-in-part of Ser. No. 930,116, Aug. 14, 1992, abandoned, which is a continuation-in-part of Ser. No. 868,466, Apr. 14, 1992, abandoned, and a continuation-in-part of Ser. No. 966,929, Oct. 27, 1992, abandoned.

[51] Int. Cl.[6] .................................................. B24B 31/112
[52] U.S. Cl. ............................. 451/35; 451/36; 451/32; 451/74; 451/104; 451/106; 451/113; 451/114
[58] Field of Search .................................. 451/35, 36, 32, 451/74, 104, 106, 113, 114, 37, 103

[56] References Cited

U.S. PATENT DOCUMENTS

| Re. 32,573 | 1/1988 | Furumara et al. |
|---|---|---|
| 1,843,198 | 2/1932 | Berguerand . |
| 1,928,036 | 9/1933 | Soderberg . |
| 2,020,714 | 11/1935 | Wulff . |
| 2,670,749 | 3/1954 | Gerner . |
| 2,735,231 | 2/1956 | Simjian . |
| 2,735,232 | 2/1956 | Simjian . |

(List continued on next page.)

FOREIGN PATENT DOCUMENTS

| 227372 | 10/1985 | Germany . |
|---|---|---|
| 79127916 | 10/1979 | Japan . |
| 63-83476 | 4/1988 | Japan . |
| 1-142905 | 6/1989 | Japan . |
| 686454 | 8/1979 | U.S.S.R. . |
| 830662 | 5/1981 | U.S.S.R. . |
| 888337 | 12/1981 | U.S.S.R. . |
| 1089968 | 1/1984 | U.S.S.R. . |
| 1154938 | 1/1985 | U.S.S.R. . |
| 1193613 | 11/1985 | U.S.S.R. . |
| 1318844 | 6/1987 | U.S.S.R. . |
| 680123 | 11/1970 | United Kingdom . |

OTHER PUBLICATIONS

S. A. Demchuk, V. I. Kordonsky, Z. P. Shulman, "Magnetorheological Characteristics of Ferromagnetic Suspensions", *Magn. Hydrodynamics* (USSR), No. 2, pp. 35–38 (1977).

(List continued on next page.)

*Primary Examiner*—D. S. Meislin
*Assistant Examiner*—Eileen P. Morgan
*Attorney, Agent, or Firm*—Kenyon & Kenyon

[57] ABSTRACT

A method of polishing an object is disclosed. In one embodiment, the method comprises the steps of creating a polishing zone within a magnetorheological fluid; determining the characteristics of the contact between the object and the polishing zone necessary to polish the object; controlling the consistency of the fluid in the polishing zone; bringing the object into contact with the polishing zone of the fluid; and moving at least one of said object and said fluid with respect to the other. Also disclosed is a polishing device. In one embodiment, the device comprises a magnetorheological fluid, a means for inducing a magnetic field, and a means for displacing the object to be polished or the means for inducing a magnetic field relative to one another.

22 Claims, 22 Drawing Sheets

U.S. PATENT DOCUMENTS

| | | |
|---|---|---|
| 2,736,409 | 2/1956 | Logan . |
| 2,751,352 | 6/1956 | Bondi . |
| 2,787,854 | 4/1957 | Simjian . |
| 2,883,809 | 4/1959 | Simjian . |
| 2,923,100 | 2/1960 | Simjian . |
| 2,994,314 | 8/1961 | Wayland et al. . |
| 3,395,720 | 8/1968 | Brooks . |
| 3,423,880 | 1/1969 | Hershler . |
| 3,500,591 | 3/1970 | Gawronski et al. . |
| 3,587,613 | 6/1971 | Mark et al. . |
| 3,665,749 | 5/1972 | Brenner . |
| 3,848,363 | 11/1974 | Lovness et al. . |
| 3,897,350 | 7/1975 | Heiba et al. . |
| 3,915,006 | 10/1975 | Ayres . |
| 3,917,538 | 11/1975 | Rosenweig . |
| 4,057,939 | 11/1977 | Basi . |
| 4,175,930 | 11/1979 | Sakulevich et al. ................. 51/281 R |
| 4,186,528 | 2/1980 | Yascheritsyn et al. . |
| 4,200,003 | 4/1980 | Miller . |
| 4,306,386 | 12/1981 | Sakulevich et al. . |
| 4,356,098 | 10/1982 | Chagnon . |
| 4,430,239 | 2/1984 | Wyman . |
| 4,599,826 | 7/1986 | Podoprigora . |
| 4,632,315 | 12/1986 | Watanabe et al. . |
| 4,632,316 | 12/1986 | Watanabe et al. . |
| 4,691,774 | 9/1987 | Nelson . |
| 4,730,418 | 3/1988 | Sugawara et al. . |
| 4,772,407 | 9/1988 | Carlson . |
| 4,802,534 | 2/1989 | Larson et al. . |
| 4,821,466 | 4/1989 | Kato et al. . |
| 4,839,074 | 6/1989 | Rossi . |
| 4,920,929 | 5/1990 | Bishop . |
| 4,956,944 | 9/1990 | Ando et al. . |
| 4,974,368 | 12/1990 | Miyamoto et al. . |
| 4,986,689 | 1/1991 | Drutchas . |
| 4,992,190 | 2/1991 | Shtarkman . |
| 4,999,954 | 3/1991 | Miyamoto et al. . |
| 5,032,307 | 7/1991 | Carlson . |
| 5,044,128 | 9/1991 | Nakano ..................................... 51/313 |
| 5,071,541 | 12/1991 | Thompson . |
| 5,076,026 | 12/1991 | Mizuguchi et al. . |
| 5,147,573 | 9/1992 | Chagnon . |
| 5,167,850 | 12/1992 | Shtarkman . |
| 5,449,313 | 9/1995 | Kordonsky et al. ...................... 451/35 |

OTHER PUBLICATIONS

E. A. Zal'tsgendler, A. V. Kolomentsev, V. I. Kordonskii et al., "Magnetorheological Converters", *Magn. Hydrodynamics*, No. 4, pp. 105–110 (USSR 1985).

V. I. Kordonsky, Z. P. Shulman, S. R. Gorodkin et al., "Physical Properties of Magnetizable Structure—Reversible Media," *Journal of Magnetism and Magnetic Materials* 85, pp. 114–120 (1990).

"Magnetic Oil", *Life Magazine*, Sep. 20, 1948.

"Magnetorheological Effect and Control of Transfer Processes", *Advances in Mechanics* vol. 12, No. 4 (1989), pp. 1–42.

T. Lucas, "Intelligent Fluids Come Out Of The Laboratories", *Technologies* (Jan. 1990).

T. Kurobe et al., "Magnetic Field–Assisted Fine Finishing", *Precision Engineering*, vol. 6, No. 3, pp. 119–124 (1984).

T. Kurobe et al., "Magnetic Field–Assisted Lapping", *Bull. Jap. Soc. Precision Eng'g*, vol. 20, No. 1, pp. 49–51 (1986).

H. Suzuki et al., "Magnetic field–assisted polishing–application to a curved surface", *Precision Engineering* 4, 197–202 (Oct. 1989).

Umehara et al., "Magnetic fluid grinding of ceramic rollers", *Electromagnetic Forces and Applications*, pp. 139–142 (1992).

Umehara et al., "Magnetic fluid grinding of ceramic flat surfaces", *Electromagnetic Forces and Applications*, pp. 143–146 (1992).

Kashevskii, Kordonsky, Prokhorov, Demchuk and Gorodkin, "Relaxation of Viscous Stresses in Magnetorheological Suspensions"*Magnitnaya Gidrodinamika*, No. 2, pp. 11–19 (Apr.–Jun. 1990).

Watanabe, J. et al., "High Precision Polishing of Semiconductor Materials Using Hydrodynamic Principle," *IRP Annual*, vol. 30 (1981), pp. 91–95.

Gormley, J. et al., "Hydroplane Polishing of semiconductor crystals," *Rev. Sci. Instrum.*, (Aug. 1981), pp. 1256–1259.

Saito, Y. et al., "Float Polishing Using Magnetic Fluid with Abrasive Grains," *Proceedings of the 6th International Conference on Production Engineering Osaka* (1987), pp. 335–340.

Cook, L., "Chemical Processes In Glass Polishing," *Journal of Non–Crystalline Solids*, vol. 120 (1990), pp. 152–171.

Wada, S. et al., "Behavior of a Bingham Solid in Hydrodynamic Lubrication," *Bulletin of the JSME*, vol. 16, No. 92, Feb., 1973, pp. 422–431.

Saffman, P., "The lift on a small sphere in a slow shear flow,"*J. Fluid Mech.*, vol. 22, part 2, (1965), pp. 385–400.

Milne, A., "A Theory of Rheodynamic Lubrication," pp. 96–101. (1954).

Mori, Y. et al., "Elastic Emission Machining," *Journal of Japan Society Of Precision Engineering* 51,6 (1985), pp. 1187–1194.

Mori, Y. et al., "Elastic Emission Machining," *Precision Engineering*, vol. 9 (Jul. 1987), pp. 123–128.

Carlson, J. et al., "Electrorheological Fluids,"*Proceedings of the Second Int'l Conference on ER Fluids (1989)* pp. 437–444.

Sasaki, T. et al., "Theory of Grease Lubrication of Cylindrical Roller Bearing," *Bulletin of JSME*, vol. 3, No. 10 (1960), pp. 212–219.

Mori, Y., et al., "Evaluation of elastic emission machined surfaces by scanning tunneling microscopy," *J. Vac. Sci. Technol.* A8(1) (Jan./Feb. 1990), pp. 621–624.

Ohtani, K. et al., "Plane Fabrication of $Bi_{12}SiO_{20}$Single Crystal Plate by Elastic Emission Machining," *Bull., Japan Soc. of Prec. Engg.*, vol. 24 No. 3 (Sep. 1990), pp. 225–226.

Tichy, J., "Hydrodynamic lubrication theory for the Bingham plastic flow model," J. Rheology, vol. No. 35(4) (May 1991), pp. 476–497.

Weiss, K. et al., "Viscoelastic Properties of Magneto–and Electro–Rheological Fluids," pp. 1300–1307.

Mori, Y. et al., "Elastic Emission Machining as Evaluated by Atomistic Technolgies," pp. 58–63. Proceeding of the 6th Int'l Conference on Production Engineering (1987).

Mori, Y. et al., "Mechanism of atomic removal in elastic emission machining ," *Precision Engineering*, vol. 10, No. 1, (Jan. 1988), pp. 24–28.

Cook. L., "Chemical Processes in Glass Polishing," *Journal of Non–Crystalline Solids*, vol. 120 (1990), pp. 152–171.

*Encyclopedia of Chemical Technology*, Fourth Edition (1993), vol. 7, pp. 566–568.

"Inhibitor (chemistry)," *McGraw Hill Encyclopedia of Science & Technology*, 6th Edition, pp. 169–171 (1987).

Doughty, G. et al., "Microcomputer–controlled polishing machine for very smooth and deep aspherical surfaces," *Applied Optics*, vol. 26, No. 12 (Jun. 1987), pp. 2421–2426.

Bajuk, D., "Computer Controlled Generation of Rotationally Symmetric Aspheric Surfaces," *Optical Engineering*, vol. 15, No. 5, (Sep.–Oct. 1976), pp. 401–405.

Ando, M. et al., "Super–smooth surface polishing on aspherical optics," *SPIE*, vol. 1720 (1992), pp. 22–33.

Ives, N. et al., "Noncontact laminar–flow polishing for GaAs," *Rev. Sci. Instrum.*, vol. 59, No. 1 (Jan. 1988), pp. 172–175.

Hamaguchi, T., "Hydrostatic float polishing for wafer preparation," *Rev. Sci. Instrum.*, vol. 55 No. 11 (nov. 1984), pp. 1867–1868.

Tichy, J., "Hydrodynamic lubrication theory for the Bingham plastic flow model," *J. Rheology*, vol. 35, No. 4 (May 1991), pp. 476–497.

Biswas, S. et al., "Elastohydrodynamic Lubrication of Spherical Surfaces of Low Elastic Modulus," *Journal of Lubrication Technology*, (Oct. 1976), pp. 524–529.

Mori, Y., "Numerically Controlled Elastic Emission Machining Consideration of Machining Process by Motion Analysis of Powder Particles in Fluid," *Journal of Japan Society Of Precision Engineering*, vol. 51, No. 5 (1985), pp. 1033–1039.

Mori, Y. et al., "Numerically Controlled Elastic Emission Machining—Motion Analysis of Fluid and Distribution of Film Thickness," *Japanese Journal of the Society for Mechanical Engineers*, vol. 49, No. 11 (1983), pp. 1–26.

Wada, S. et al., "Behavior of a Bingham Solid in Hydrodynamics Lubrication," *Bulletin of the JSME*, vol. 16, No. 92 (Feb. 1973), pp. 432–440.

Kordonsky, V. et al., "Physical Properties Of Magnetizable Structure–Reversible Media," *Journal of Magnetism and Magnetic Materials*, vol. 85 (1990), pp. 114–120.

"Magnetorheological Effect and Control of Transfer Processes" *Advances in Mechanics*, vol. 12, No. 4 (1989), pp. 1–42.

Raj, K. et al., "Commercial Applications Of Ferrofluids," *Journal of Magnetism and Magnetic Materials*, vol. 85 (1990), pp. 233–245.

Tesar, A., et al., "Examination of the polished surface character of fused silica," *Applied Optics*, vol. 31, No. 34 (Dec. 1992), pp. 7164–7172.

Mil'Shtein, S. et al., "Low–Pressure Polishing Of GaAs Wafers," *Materials Letters*, vol. 5, No. 7.8(Jul. 1987), pp. 258–259.

Matsushita, H. et al., "Improvemetns in GaAs Wafer Processes to Achieve Better Flatness," *Furukawa review: Furukawa Electric Co.* (Aug. 1989), pp. 6–10.

Schwenk, W., "Corrosion of Iron in Alkaline Solutions and Associated Fundamental Questions" *Werkst. Korros.* (1983) pp. 287–290 (Translated Abstract).

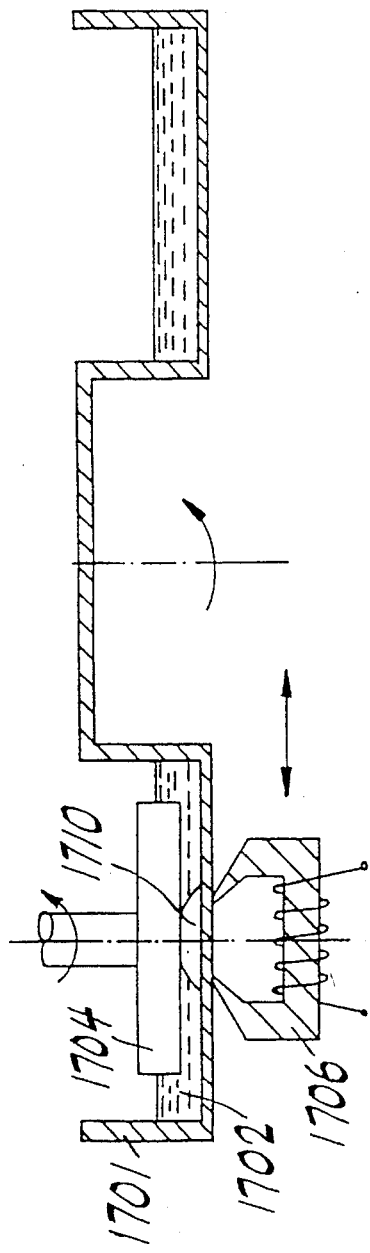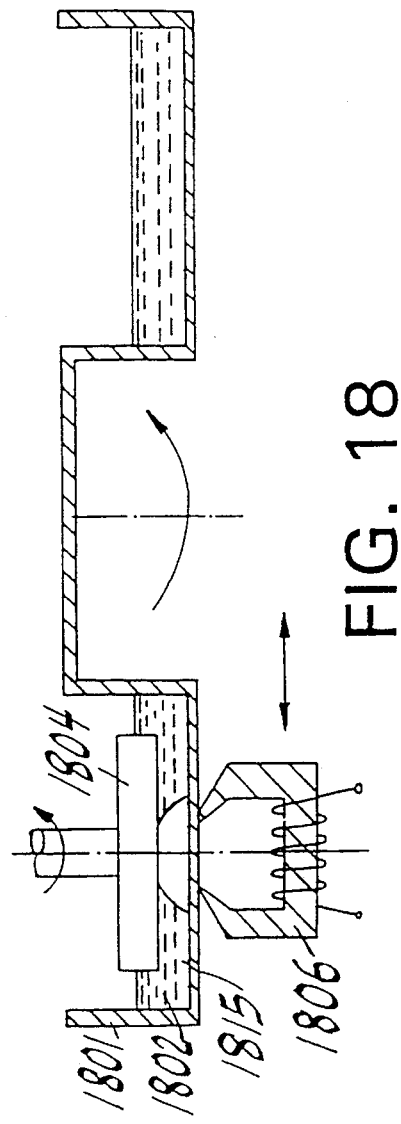

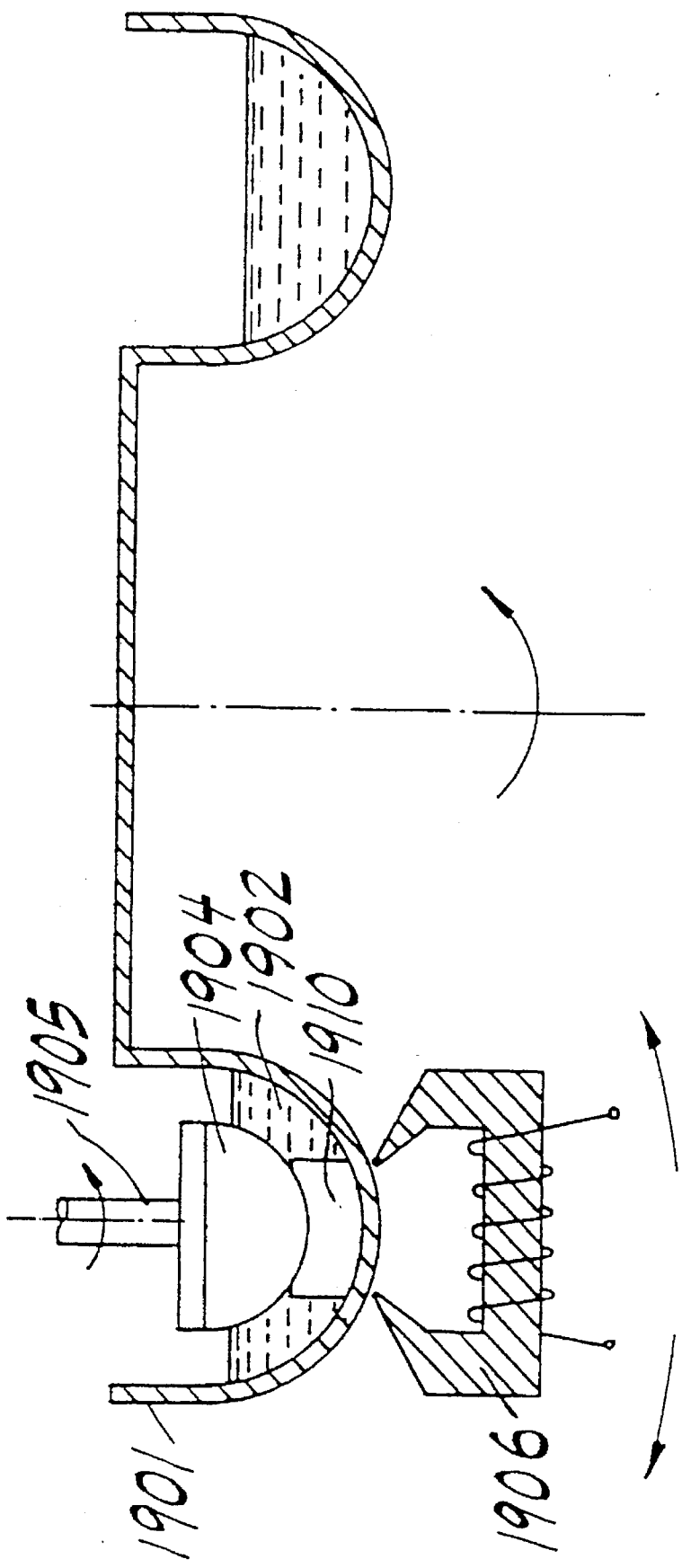

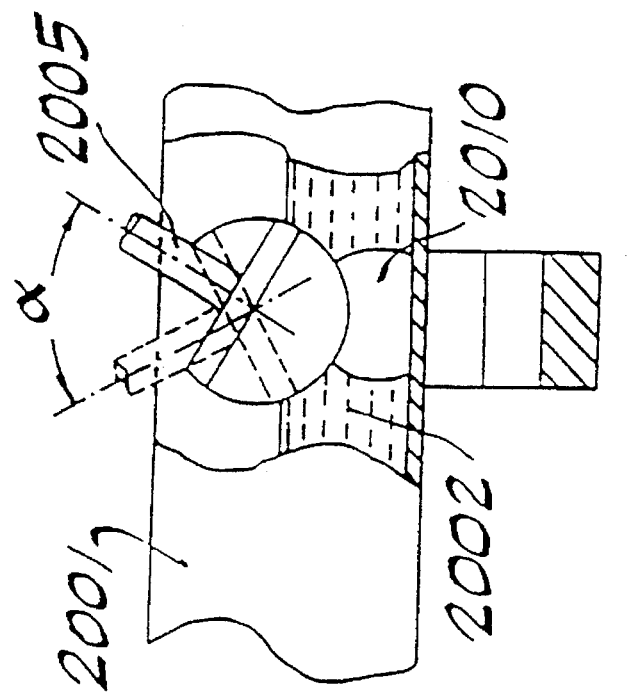
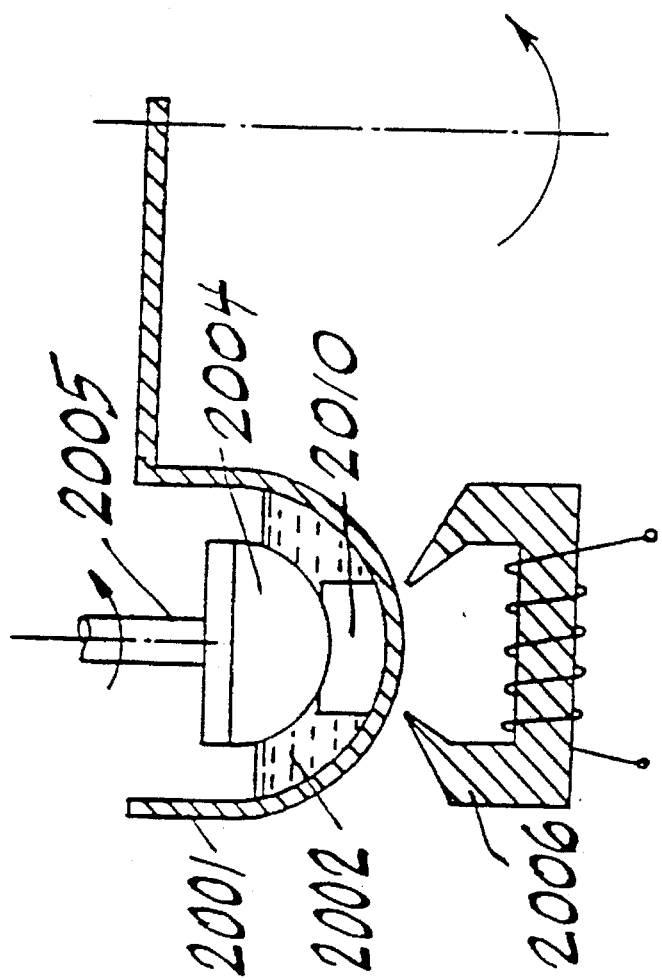
FIG. 20B
FIG. 20A 5,577,948

MAGNETORHEOLOGICAL POLISHING DEVICES AND METHODS

This application is a continuation of application Ser. No. 08/071,813, filed on Jun. 4, 1993, now U.S. Pat. No. 5,449,313, which is a continuation-in-part of Ser. No. 966,919, abandoned, filed Oct. 27, 1992, which is a continuation-in-part of U.S. Ser. No. 930,116, filed Aug. 14, 1992, abandoned, which is a continuation-in-part of U.S. Ser. No. 868,466, abandoned, filed Apr. 14, 1992, and this application is a continuation-in-part of Ser. No. 966,929, abandoned filed Oct. 27, 1992, which is a continuation-in-part of pending U.S. Ser. No. 868,466, filed Apr. 14, 1992, abandoned.

FIELD OF THE INVENTION

This invention relates to methods of polishing surfaces using magnetorheological fluids.

BACKGROUND OF THE INVENTION

Workpieces such as glass optical lenses, semiconductors, tubes, and ceramics have been polished in the art using one-piece polishing tools made of resin, rubber, polyurethane or other solid materials. The working surface of the polishing tool should conform to the workpiece surface. This makes polishing complex surfaces complicated, and difficult to adapt to large-scale production. Additionally, heat transfer from such a solid polishing tool is generally poor, and can result in superheated and deformed workpieces and polishing tools, thus causing damage to the geometry of the workpiece surface and/or the tool.

Co-pending application Ser. Nos. 966,919, filed Oct. 27, 1992, and 930,116, filed Aug. 14, 1992, disclose a magnetorheological fluid composition, a method of polishing an object using a magnetorheological fluid, and polishing devices which may be used according to the disclosed polishing method. While the method and devices disclosed in that application represent a significant improvement over the prior art, further advances that improve the devices, methods, and results achieved are possible.

SUMMARY OF THE INVENTION

This invention is directed to improved devices and methods for polishing objects in a magnetorheological polishing fluid (MP-fluid). More particularly, this invention is directed to a highly accurate method of polishing objects, in a magnetorheological fluid, which may be automatically controlled, and to improved polishing devices. The method of this invention comprises the steps of creating a polishing zone within a magnetorheological fluid; bringing an object to be polished into contact with the polishing zone of the fluid; determining the rate of removal of material from the surface of the object to be polished; calculating the operating parameters, such as magnetic field Is intensity, dwell time, and spindle velocity, for optimal polishing efficiency; and moving at least one of said object and said fluid with respect to the other according to the operating parameters.

The polishing device comprises an object to be polished, a magnetorheological fluid, which may or may not be contained within a vessel, a means for inducing a magnetic field, and a means for moving at least one of these components with respect to one or more of the other components. The object to be polished is brought into contact with the magnetorheological fluid and the magnetorheological fluid, the means for inducing a magnetic field, and/or the object to be polished are put into motion, thereby allowing all facets of the object to be exposed to the magnetorheological fluid.

In the method and devices of this invention, the magnetorheological fluid is acted upon by a magnetic field in the region where the fluid contacts the object to be polished. The magnetic field causes the MP-fluid to acquire the characteristics of a plasticized solid whose yield point depends on the magnetic field intensity and the viscosity. The yield point of the fluid is high enough that it forms an effective polishing surface, yet still permits movement of abrasive particles. The effective viscosity and elasticity of the magnetorheological fluid when acted upon by the magnetic field provides resistance to the abrasive particles such that the particles have sufficient force to abrade the workpiece.

BRIEF DESCRIPTION OF THE DRAWINGS

FIG. 17 is a cross-sectional side view of another embodiment of the invention.

FIG. 18 is a cross-sectional side view of another embodiment of the invention.

FIG. 19 is a cross-sectional side view of another embodiment of the invention.

FIG. 20A is a cross-sectional side view of another embodiment of the invention.

FIG. 20B is a cross-section front view of the apparatus of FIG. 20A.

DETAILED DESCRIPTION OF THE PREFERRED EMBODIMENTS

Figure 1:
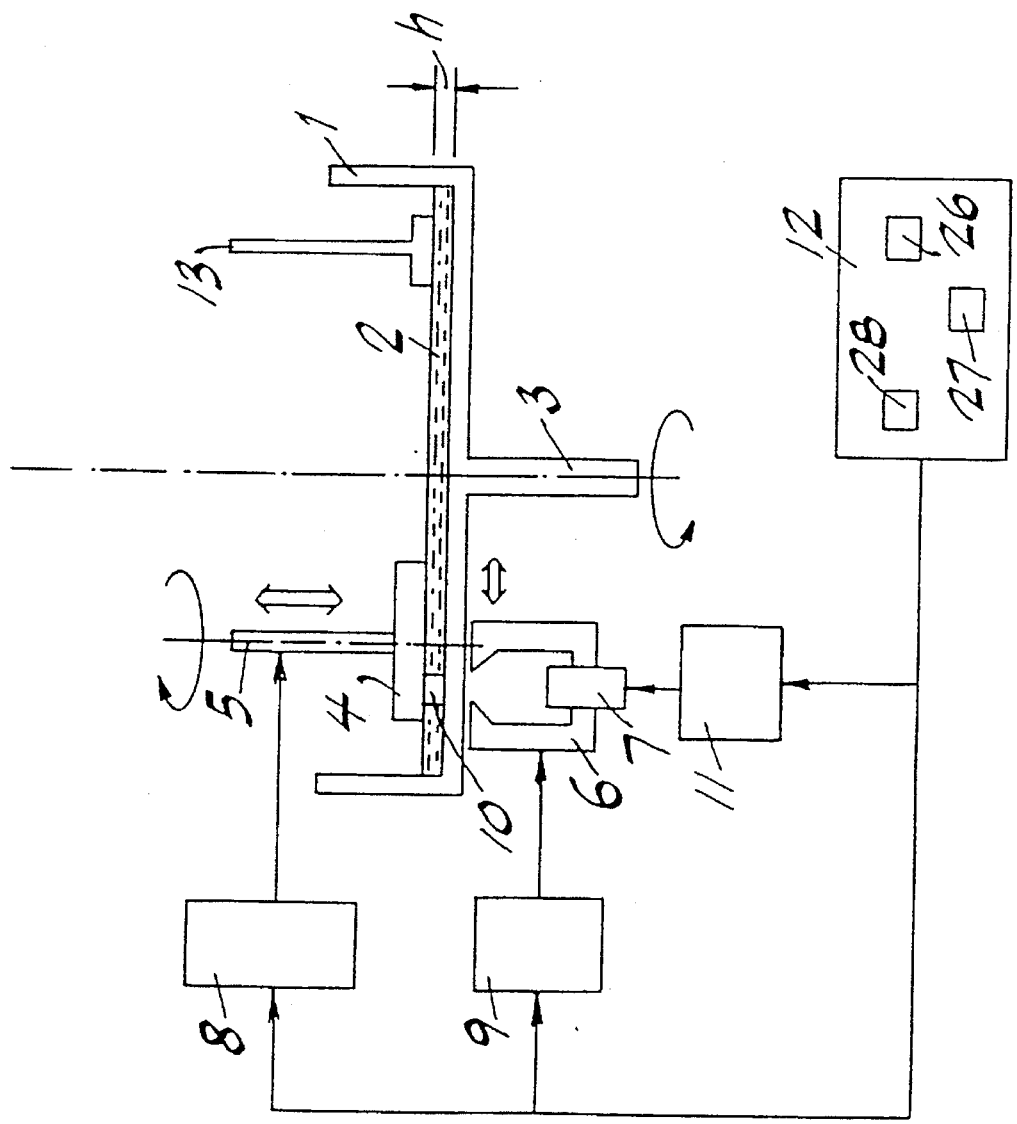
FIG. 1 is a cross-sectional side view of a polishing device of the invention.

FIG. 1 is a schematic of a polishing device which may be operated according to the method of the present invention. In FIG. 1, a cylindrical vessel 1 contains magnetorheological polishing fluid (MP-fluid) 2. In a preferred embodiment, the MP-fluid 2 contains an abrasive. Vessel 1 is preferably constructed of a non-magnetic material which is inert to the MP-fluid 2. In FIG. 1, vessel 1 is semi-cylindrically shaped in cross-section and has a flat bottom. However, the particular shape of vessel 1 may be modified to suit the workpiece to be polished, as will be described in greater detail.

An instrument 13, such as a blade, is mounted into vessel 1 to provide continuous stirring of the MP-fluid 2 during polishing. A workpiece 4 to be polished is connected to a rotatable workpiece spindle 5. Workpiece spindle 5 is preferably made from a non-magnetic material. Workpiece spindle 5 is mounted on a spindle slide 8, and can be moved in the vertical direction. Spindle slide 8 may be driven by a conventional servomotor which operates according to electrical signals from a programmable control system 12.

Rotation of vessel 1 is controlled by vessel spindle 3, which is preferably positioned in a central location below vessel 1. Vessel spindle 3 can be driven by conventional motor or other power source.

An electromagnet 6 is positioned adjacent to vessel 1 so as to be capable of influencing the MP-fluid 2 in a region containing the workpiece 4. Electromagnet 6 should be capable of inducing a magnetic field sufficient to carry out the polishing operation, and preferably will induce a magnetic field of at least about 100 kA/m. Electromagnet 6 is activated by winding 7 from power supply unit 11 which is connected to control system 12. Winding 7 can be any conventional magnetic winding. Electromagnet 6 is set up on an electromagnet slide 9 and can be moved in a horizontal direction, preferably along the radius of vessel 1. Electromagnet slide 9 may be driven by a conventional servomotor which operates according to electrical signals from the programmable control system 12.

Winding 7 is activated by power supply unit 11 during polishing to induce a magnetic field and influence the MP-fluid 2. Preferably, MP-fluid 2 is acted on by a nonuniform magnetic field in a region adjacent to the workpiece 4. In this preferred embodiment, equal-intensity lines of the field are normal, or perpendicular, to the gradient of said field, and the force of the magnetic field is a gradient directed toward the vessel bottom normal to the surface of workpiece 4. Application of the magnetic field from electromagnet 6 causes the MP-fluid 2 to change its viscosity and plasticity in a limited polishing zone 10 adjacent to the surface being polished. The size of the polishing zone 10 is defined by the gap between the pole-pieces of the electromagnet 6 and the shape of the tips of the electromagnet 6. Abrasive particles in the MP-fluid are preferably acted upon by the MP-fluid substantially only in polishing zone 10, and the pressure of MP-fluid against the surface of workpiece 4 is largest in the polishing zone 10.

The composition of the MP-fluid 2 used in the method and devices discussed herein is preferably as described in co-pending application Ser. Nos. 966,919, filed Oct. 27, 1992, 966,929, filed Oct. 27, 1992, 930,116, filed Aug. 14, 1992, and 868,466, filed Apr. 14, 1992, which are incorporated herein by reference. In a preferred embodiment, an MP-fluid composed according to co-pending application Ser. Nos. 966,919 or 930,116 comprising a plurality of magnetic particles, a stabilizer, and a carrying fluid selected from the group consisting of water and glycerin, is used. In a further preferred embodiment, the magnetic particles (preferably carbonyl iron particles) are coated with a protective layer of a polymer material which inhibits their oxidation. The protective layer is preferably resistant to mechanical stresses, and as thin as practicable. In a preferred embodiment, the coating material is teflon. The particles may be coated by the usual process of microcapsulation.

Figure 8:
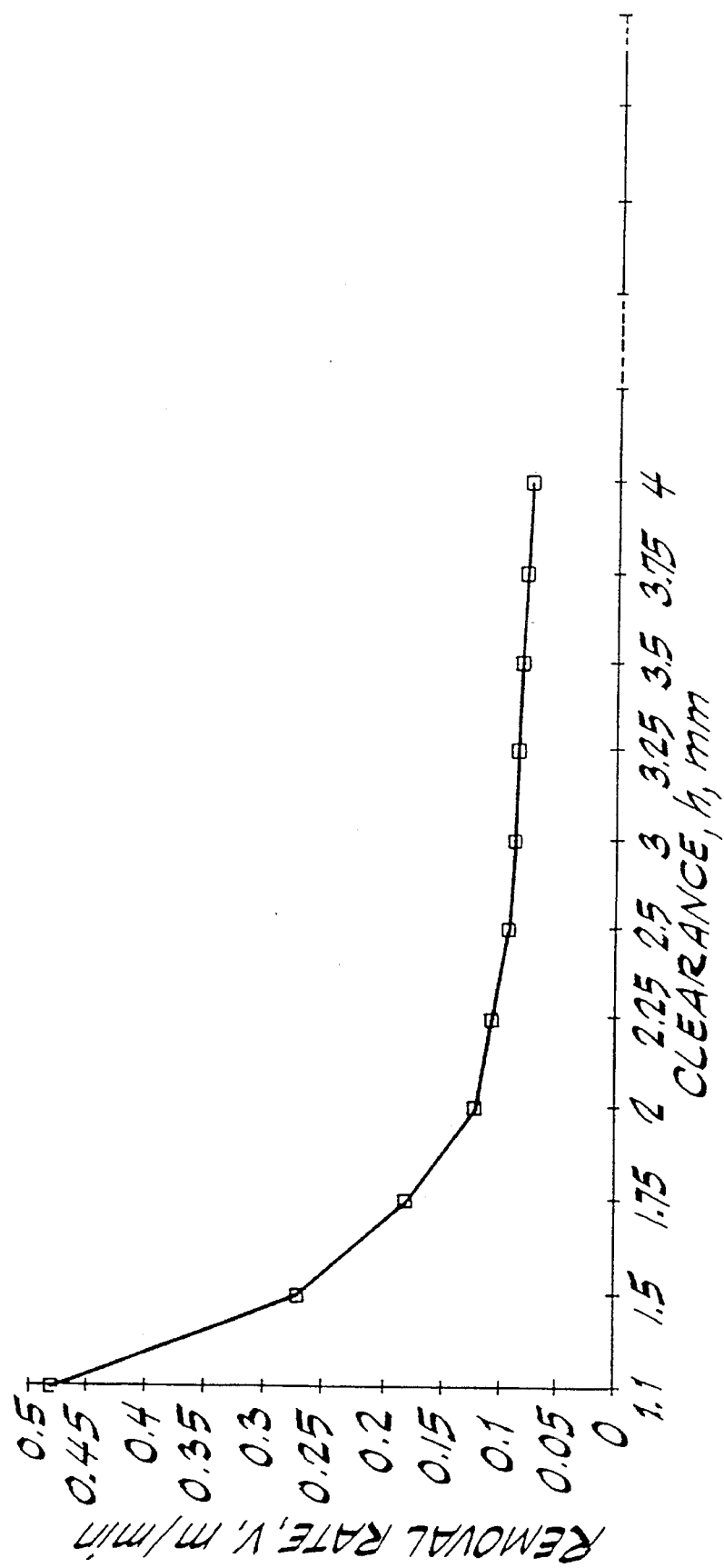
FIG. 8 is a graph showing the relationship between the rate of material removal during polishing and the clearance between a workpiece and the bottom of a vessel in which the workpiece is polished.

The polishing machine shown in FIG. 1 can operate as follows. Workpiece 4 is coupled to workpiece spindle 5, and positioned by spindle slide 8 at a clearance, h, with respect to the bottom of vessel 1 so that preferably a portion of the workpiece 4 to be polished is immersed in the MP-fluid 2. Said clearance h may be any suitable clearance which will permit polishing of the workpiece. The clearance h will affect the material removal rate V for the workpiece 4, as illustrated in FIG. 8, and will also affect the size of a contact spot $R_z$ at which the polishing zone 10 contacts the workpiece 4. The clearance h is preferably chosen so that the surface area of the contact spot $R_z$ is less than one third of the surface area of the workpiece 4. The clearance h may be changed during the polishing process.

In a preferred embodiment, both workpiece 4 and vessel 1 are rotated, preferably counter to each other. Vessel spindle 3 is put into rotating motion, thereby rotating vessel 1. Vessel spindle 3 rotates about a central axis and preferably rotates vessel 1 at a speed sufficient to effect polishing but insufficient to generate a centrifugal force sufficient to substantially eject or spray MP-fluid 2 out of vessel 1. In a preferred embodiment, the vessel is rotated at a constant velocity. The motion of vessel 1 provides continuous delivery of a fresh portion of MP-fluid 2 to the region where workpiece 4 is located, and provides continuous motion of the MP-fluid 2 in contact with the surface of the workpiece being polished in the polishing zone 10. In a preferred embodiment additional carrying fluid, preferably water or glycerin, is added during polishing to replenish carrying fluid that has vaporized, and thus maintain the properties of the fluid.

Workpiece spindle 5 is also rotated, about a central axis, to provide rotating movement to workpiece 4. In a preferred embodiment, workpiece spindle 5 operates at speeds of up to 2000 rpm, with about 500 rpm particularly preferred. The motion of workpiece spindle 5 continuously brings a fresh part of the surface of the workpiece 4 into contact with the polishing zone 10, so that material removal along the circumference of the surface being polished will be substantially uniform.

As abrasive particles in the MP-fluid 2 contact the workpiece 4, a ring-shaped area having a width of the polishing zone is gradually polished on to the surface of the workpiece 4. Polishing is accomplished in one or more cycles, with an incremental amount of material removed from the workpiece in each cycle. Polishing of the whole surface of the workpiece 4 is achieved by radial displacement of the electromagnet 6 using electromagnet slide 9, which causes the polishing zone 10 to move relative to the workpiece surface.

The radial motion of the electromagnet 6 may be continuous, or in discrete seeps. If the movement of the electromagnet 6 is continuous, the optimal velocity $U_z$ of electromagnet 6 for each point of the trajectory of motion is calculated. The velocity of the electromagnet, $U_z$, can be calculated according to the following formulae:

(I) $U_z = 2R_z/t$ or (II) $U_z \leq 2R_z V/k_3$ wherein $R_z$ is the radius of the contact spot, in mm, in the polishing zone 10 which contacts the workpiece 4, t is the time, in seconds, for which the contact spot $R_z$ is polished during one cycle, V is the material removal rate, in μm/min, and $k_3$ is the thickness, in μm, of the workpiece material layer to be removed during one cycle of polishing.

$R_z$ is a function of the clearance h, as described above. The material removal rate, V, can be empirically determined given the clearance h and the velocity at which the vessel 1 is rotated. The material removal rate V may be determined by measuring the amount of material removed from a given spot in a given time. The thickness of the workpiece material layer to be removed during one polishing cycle, $k_3$, is a function of the accuracy required for the finished workpiece; $k_3$ may be selected to minimize local error accumulation. For example, when optical glass is polished, the value of $k_3$ is determined by the required fit to shape in waves. The amount of time for which the contact spot $R_z$ should be polished during one cycle, t, is calculated according to the formula:

$t \leq k_3/V$

When $k_3$ and the velocity of the magnet, $U_z$, have been determined, the number of cycles required and the time required for polishing may be determined. To calculate the total number of cycles, N, to polish the workpiece 4, the thickness of the layer of material to be removed during polishing, K, is calculated according to the formula:

$K = k_1 + k_2$ where $k_1$ is the initial surface roughness in μm, and $k_2$ is the thickness of the subsurface damage layer in μm. The number of cycles required, N, may then be determined using the formula:

$N = K/k_3$

Figure 5:
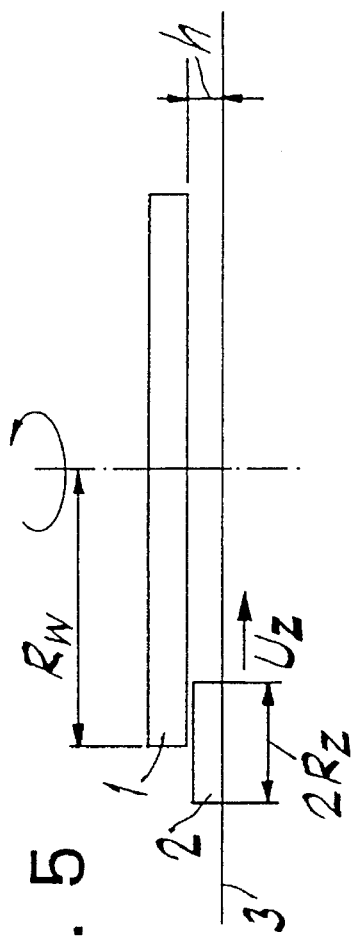
FIG. 5 is a schematic diagram illustrating the parameters used in the method of the invention to control polishing for a flat workpiece.

The amount of time required for one cycle, $t_c$, may be calculated using the following formula:

$t_c = R_w/U_z$ where $R_w$ is the radius of the workpiece. FIG. 5 shows the relationship of the radius of the workpiece $R_w$, the contact spot $R_z$, the clearance h, and the velocity of the magnet $U_z$ for a flat workpiece such as is shown in FIG. 1.

The total time T required for polishing may be calculated using the formula:

$T = NR_w/U_z$ where N is the number of cycles required, $R_w$ is the radius of the workpiece, and $U_z$ is the velocity of the electromagnet 6.

If the electromagnet 6 is moved in discrete steps, the dwell time at each step must be determined. In a preferred embodiment, the overall material removal is maintained constant at each step. To remove a constant amount of material during stepwise polishing, it is necessary to take into account material removal due to overlapping of the contact spots $R_z$ at successive steps. The coefficient of overlapping, I, is determined by the formula:

$I = r/2R_z$ where r is the displacement of the workpiece in a single step, in mm, and $R_z$ is the radius of the contact spot. The displacement in a single step, r, may be determined empirically using results from preliminary trials, such as those detailed in the example given below.

The dwell time for each step in a given cycle, $t_d$, may be determined according to the formula:

$t_d = k_3 I/V$ where $k_3$ is the thickness of the workpiece material layer to be removed during one polishing cycle, I is the coefficient of overlapping, and V is the material removal rate for the workpiece an a given clearance h and a given velocity of the vessel 1.

The number of steps in one cycle, $n_s$, for stepwise polishing may be determined using the formula:

$n_s = R_w/r$ where $R_w$ is the radius of the workpiece, and r is the displacement of the workpiece in a single step. The total number of cycles, N, required to polish the workpiece may be calculated using the formula used with continuous polishing, that is:

$N = K/k_3$ where K is the thickness of the layer of material to be removed during polishing, and $k_3$ is the thickness of the workpiece material layer to be removed during one polishing cycle. The total time required for stepwise polishing, T, may be calculated using the formula:

$T = t_d n_s N$ where $t_d$ is the dwell time for each step, $n_s$ is the number of steps in one cycle, and N is the total number of cycles.

In a preferred embodiment of the invention, a computer program for control unit 12 may be prepared on the basis of these calculations, for either continuous or stepwise polishing. The whole process of polishing a workpiece 4 may then be conducted under automatic control. As shown in FIG. 1, the control unit 12 preferably includes an input device 26, a processing unit 27, and a signal generator 28.

Figure 4:
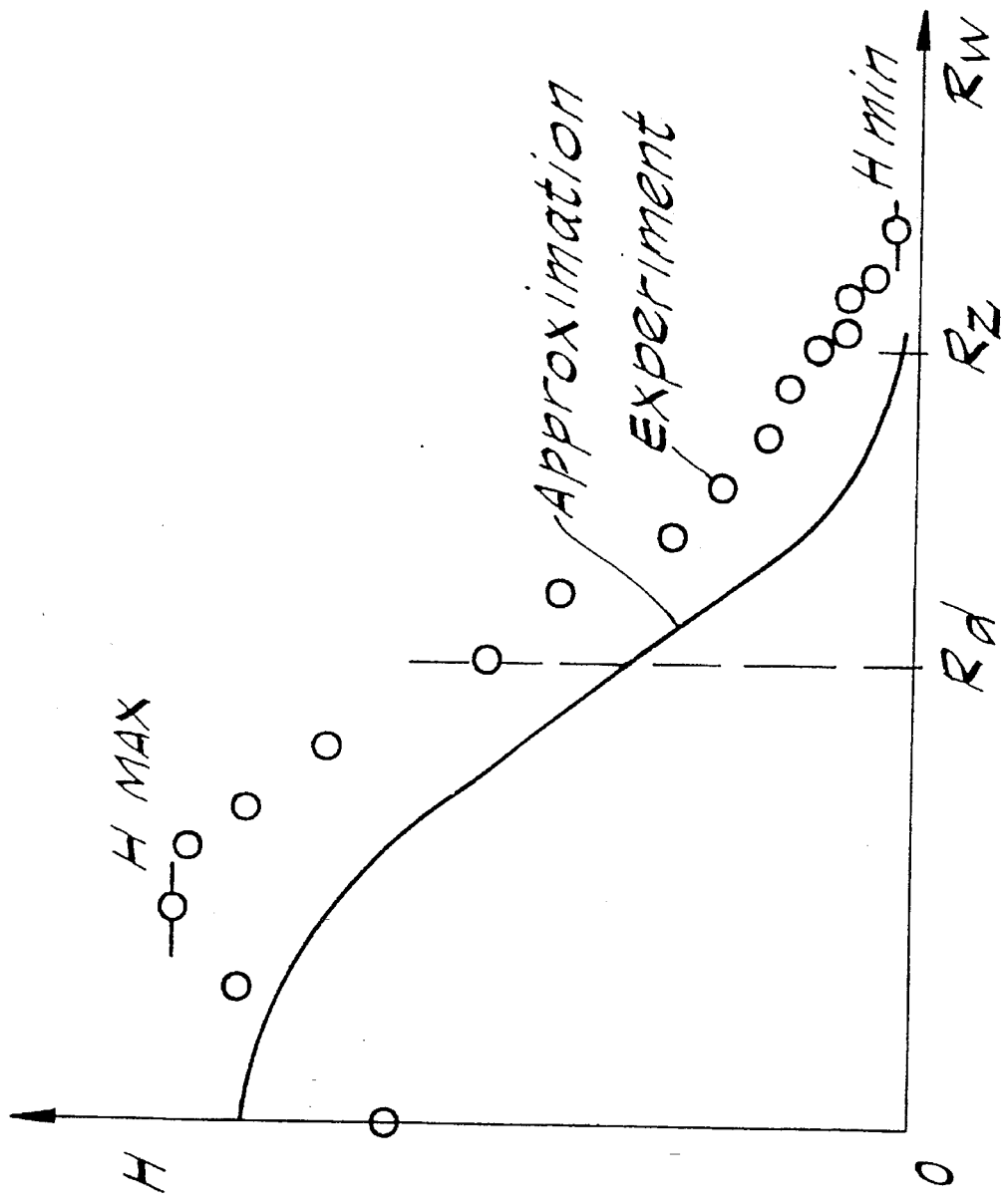
FIG. 4 is a graph showing the amount of material removed, as a function of distance from the center of the workpiece, for an exemplary workpiece.

In an alternate embodiment of the invention, the accuracy of figure generation, or correspondence of the finished workpiece to the desired shape and tolerances, may be improved by conducting tests to determine the spatial distribution of the removal rate of the material as a function of $R_z$, $V[R_z]$, in the contact spot $R_z$. The spatial distribution of the removal rate may be determined by the method of successive approximation, as detailed in the example given below and in FIG. 4. The spatial distribution of the removal rate may then be used to more accurately determine the parameters of the polishing program, such as the dwell time, $t_d$, using the formulas previously discussed. In this case, the dwell time can be determined using the formula:

$$t_d = k_3 l / V[R_z]$$

Figure 2B:
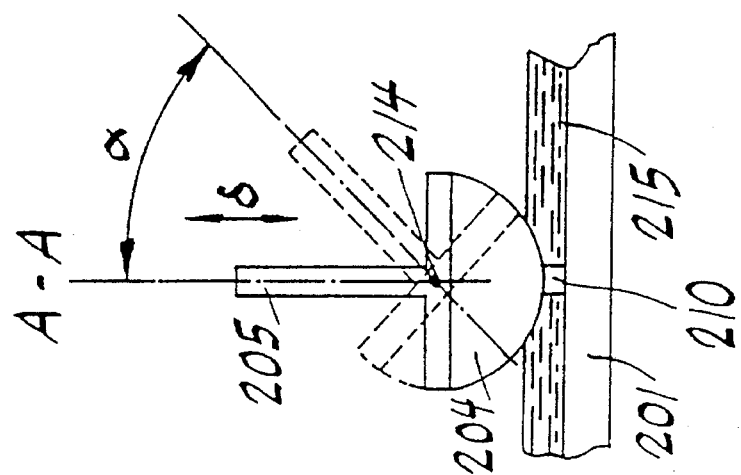
FIG. 2B is an enlarged view of a portion of the apparatus of FIG. 2A.
Figure 2A:
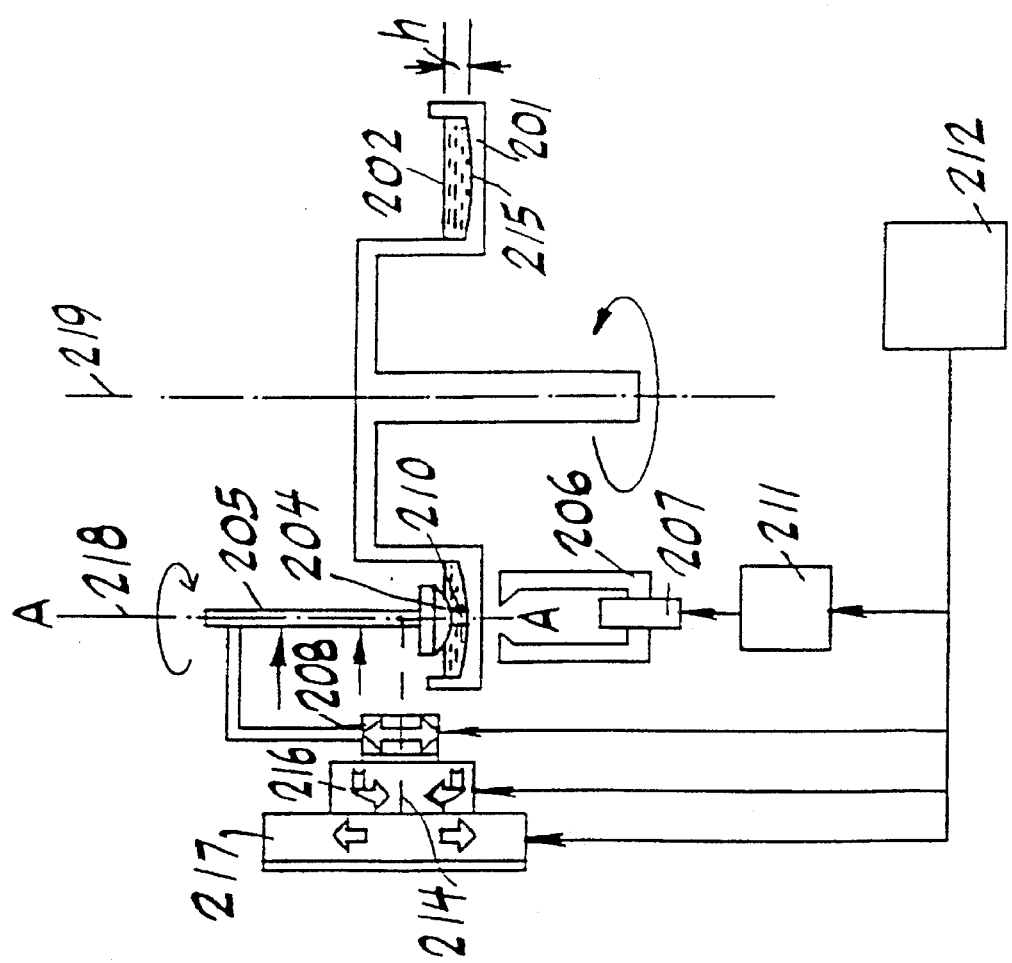
FIG. 2A is a cross-sectional side view of another embodiment of the invention.

Referring to FIGS. 2A and 2B, there is shown an alternate embodiment of the invention. This embodiment achieves highly efficient polishing of convex workpieces 204, such as spherical and nonspherical optical lenses. In FIGS. 2A and 2B, the vessel 201 is a circular trough, and the radius of curvature of the internal wall, adjacent to polishing zone 210, is larger than the largest radius of curvature of workpiece 204. During polishing, it is desirable to minimize the movement of the fluid 202 relative to the vessel 201. To minimize this movement, or slippage, of the MP-fluid 202, the internal wall of the vessel 201 may be covered with a layer of a nap, or porous, material 215 to provide reliable mechanical adhesion between the MP-fluid 202 and the wall of the vessel 201.

Workpiece spindle 205 is connected with spindle slide 208, which is connected with a rotatable table 216. The rotatable table 216 is connected to a table slide 217. Spindle slide 208, rotatable table 216, and table slide 217 may be driven by conventional servomotors which operate according to electrical signals from programmable control system 212. Rotatable table 216 permits workpiece spindle 205 to be continuously rocked about its horizontal axis 214, or permits its positioning at an angle α with the initial vertical axis 218 of spindle 205. Axis 214 preferably is located at the center of curvature of the polished surface at the initial vertical position of the workpiece spindle. Spindle slide 208 permits vertical displacement δ of the center of polished surface curvature relative to axis 214. Table slide 217 moves the rotatable table 216 with spindle slide 208 and workpiece spindle 205 to obtain, and maintain, the desired clearance h between the polished surface of workpiece 204 and the bottom of vessel 201. In this embodiment, an electromagnet 206 is stationary, and is positioned below the vessel 201 such that its magnetic gap is symmetric about the workpiece spindle axis 218 when this axis is perpendicular to the plane of polishing zone 210. The device illustrated in FIGS. 2A and 2B is the same as the device shown in FIG. 1 in all other respects.

The polishing machine operates as follows. To polish workpiece 204, workpiece spindle 205 with attached workpiece 204 is positioned so that the center of the radius of curvature of workpiece 204 is brought into coincidence with the pivot point (axis of rotation 214) of the rotatable table 216. The removal rate for the workpiece to be polished is then determined experimentally, using a test workpiece similar to the workpiece to be polished. Polishing of work piece 204 may then be conducted automatically by moving its surface relative to polishing zone 210 using rotatable table 216, which rocks workpiece spindle 205 and changes the angle α according to calculated regimes of treatment.

Figure 6:
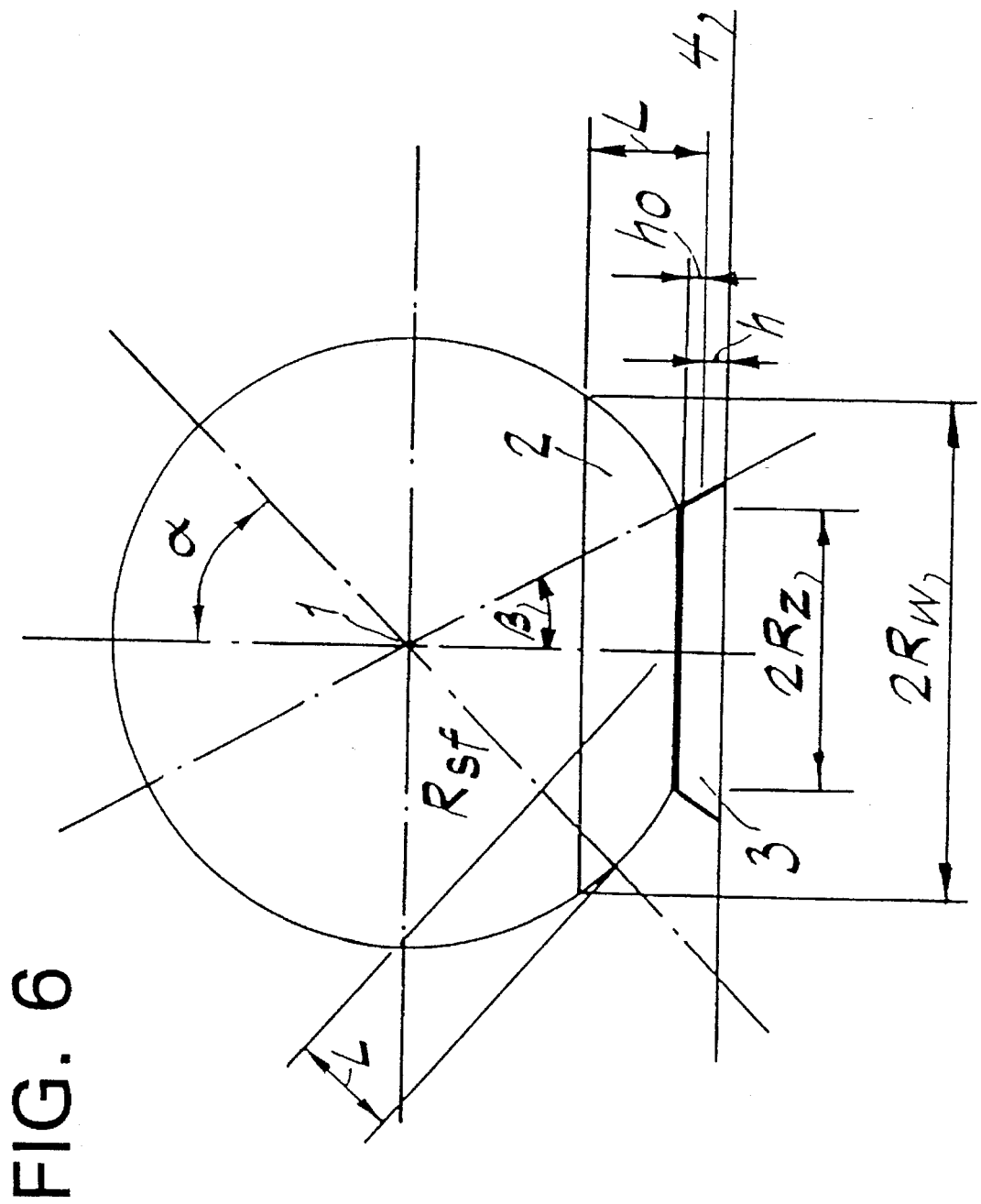
FIG. 6 is a schematic diagram illustrating the parameters used in the method of the invention to control polishing for a curved workpiece.

The maximal angle α to which the spindle 205 may be rocked is determined using the formula:

$$\cos \alpha_{max} = (R_{sf} - L)/R_{sf}$$

where $R_{sf}$ is the radius of the total sphere. As shown in FIG. 6, $R_{sf}$ represents what the radius of the workpiece would be if it were spherical, based upon the radius of curvature of the actual workpiece 204. L represents the thickness of the workpiece 204, as indicated on FIG. 6, and it may be calculated using the formula:

$$L = R_{sf} - \sqrt{R^2_{sf} - R^2_w}$$

The angle dimension of the contact spot, β, also indicated on FIG. 6, may be determined using the formula:

$$\cos \beta = (R_{sf} - h_0)/R_{sf}$$

where $R_{sf}$ is the radius of the total sphere and $h_0$ is the clearance between the bottom of the vessel 201 and the edge of the contact spot $R_z$ for a curved workpiece, as shown in FIG. 6. The height of the contact spot, $h_0$, may be determined using the formula:

$$h_0 = R_{sf} - \sqrt{R^2_{sf} - R^2_z}$$

where $R_{sf}$ is the radius of the total sphere and $R_z$ is the width of the contact spot.

Rocking of workpiece spindle 205 may be continuous or stepwise. If the workpiece spindle 205 is continuously rocked, the angular velocity $\omega_z$ of this motion is determined by the formula:

$$\omega_z \geq \beta V / k_3$$

where β is the angle dimension of the contact spot, V is the material removal rate, and $k_3$ is the thickness of the workpiece material layer to be removed during one cycle of polishing. The duration of one cycle, $t_c$, may then be calculated using the formula $$t_c = \alpha_{max}/\omega_z$$

where $\alpha_{max}$ is the maximal angle α to which the spindle 205 may be rocked, and $\omega_z$ is the angular velocity of the rocking motion.

To calculate the total number of cycles, N, to polish the workpiece 204, the thickness of the layer of material to be removed during polishing, K, is calculated according to the formula $$K = k_1 + k_2$$

where $k_1$ is the initial surface roughness in μm, and $k_2$ is the thickness of the subsurface damage layer in μm. The number of cycles required, N, may then be determined using the formula $$N = K/k_3$$

where $k_3$ is the thickness of the workpiece material layer to be removed during one cycle of polishing.

The total time T required to polish the workpiece may then be calculated using the formula $$T = t_c N$$

where $t_c$ is the duration of one cycle, and N is the number of cycles required.

If the workpiece spindle 205 is rocked in discrete steps, the dwell time for each step must be calculated. In calculating the dwell time for each step, it is necessary to take the coefficient of overlapping I into account. The coefficient of overlapping I is determined by the formula $$I = \alpha_s/\beta$$

where $\beta$ is the angle dimension of the contact spot, and $\alpha_s$ is the angle displacement for one step. The angle displacement for one step, $\alpha_s$, may be calculated by the formula:

$$\alpha_s = \alpha_{max}/n_s$$

where $\alpha_{max}$ is the maximal angle $\alpha$ to which the spindle 205 may be rocked, and $n_s$ is the number of steps in one cycle. The number of steps per cycle, $n_s$, may be calculated using the formula $$n_s = \alpha_{max}/\beta$$

where $\alpha_{max}$ is the maximal angle $\alpha$ to which the spindle 205 may be rocked, and $\beta$ is the angle dimension of the contact spot. The current angle $\alpha$ during polishing may be calculated using the formula:

$$\alpha = \alpha_s N_s$$

where $\alpha_s$ is the angle displacement for one step, and $N_s$ is the number of the current step.

To calculate the total number of cycles, N, to polish the workpiece 204, the thickness of the layer of material to be removed during polishing, K, is calculated according to the formula:

$$K = k_1 + k_2$$

where $k_1$ is the initial surface roughness in μm, and $k_2$ is the thickness of the subsurface damage layer in μm. The number of cycles required, N, may then be determined using the formula:

$$N = K/k_3$$

where $k_3$ is the thickness of the workpiece material layer to be removed during one cycle of polishing.

The dwell time at each step may be calculated using the formula:

$$t_d = k_3 I/V$$

where $k_3$ is the thickness of the workpiece material layer to be removed during one cycle of polishing, I is the coefficient of overlapping, and V is the material removal rate. The total time T required to polish the workpiece may then be calculated using the formula:

$$T = t_d n_s N$$

where $t_d$ is the dwell time for each step, $n_s$ is the number of steps per cycle, and N is the number of cycles required.

The polishing may be conducted under conditions which yield uniform material removal from each point of the surface, if it is desired that the surface figure should not be altered, or specific material removal goals for each point on the surface may be achieved by varying the dwell time.

When a non-spherical workpiece 204 is to be polished, the procedure is generally the same as described for a spherical workpiece. A non-spherical workpiece 204 may be polished to the desired shape by varying the dwell time depending upon the radius of curvature of the section of the workpiece being polished. In an alternate embodiment for polishing a non-spherical workpiece, workpiece spindle 205 may also be moved vertically during polishing. To polish a non-spherical object, the calculations previously described may be carried out for each section of the workpiece having a different radius of curvature. As it is rocked to angle $\alpha$, the radius of curvature of the section of a non-spherical workpiece being polished changes. To bring the momentary radius of curvature for the section of the workpiece 204 being polished into coincidence with pivot point 214, rocking of the workpiece spindle 205 is accompanied with vertical motion by spindle slide 208 when polishing non-spherical objects.

Figure 7:
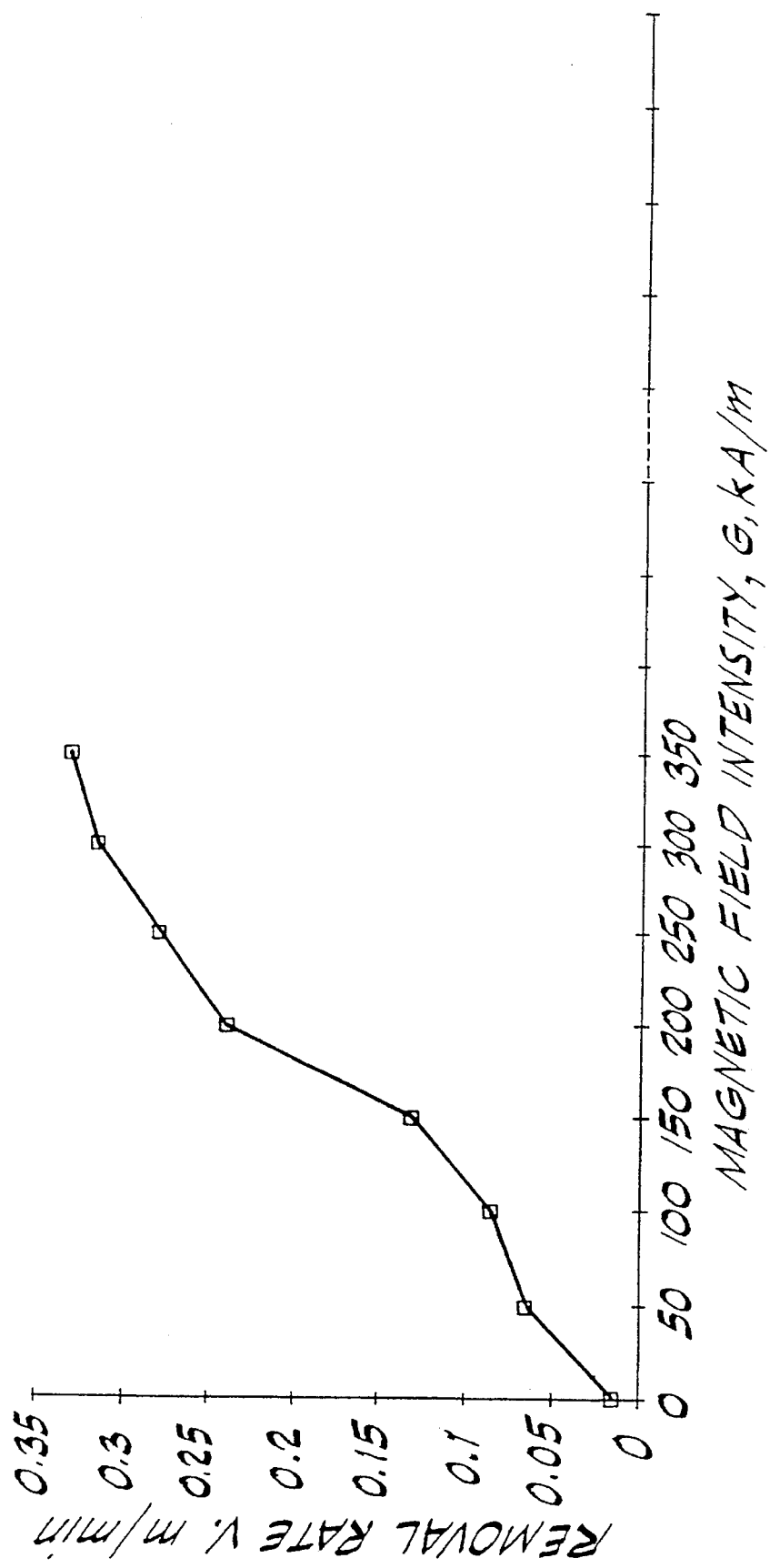
FIG. 7 is a graph showing the relationship between the rate of material removal during polishing and the magnetic field intensity.

The magnetic field strength may also be varied for each stage of treatment during polishing, if desired. The material removal rate V is a function of the magnetic field intensity G, as shown in FIG. 7. It is therefore possible to change the quantities of the operating parameters, such as dwell time or clearance. Thus the magnetic field strength may be used as another means for controlling the polishing process.

Figure 3:
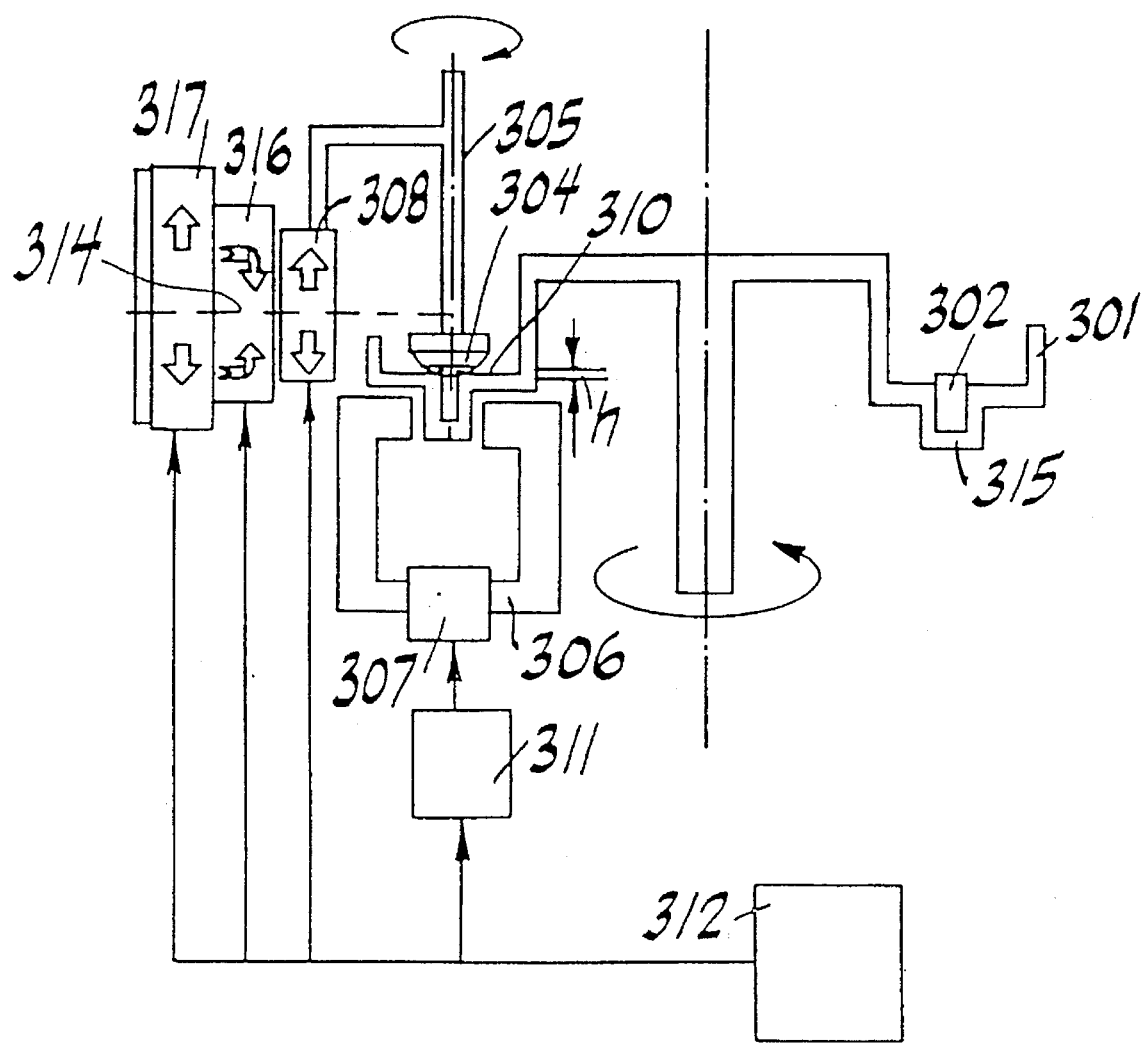
FIG. 3 is a cross-sectional side view of another embodiment of the invention.

Referring to FIG. 3, there is shown an alternate embodiment of the invention. In FIG. 3, the internal wall of the vessel 301 has an additional circular trough which passes through the gap of the electromagnet 306. This configuration of the internal wall of the vessel 301 results in a smaller, more focused, polishing zone 310, and an increase in adhesion between the MP-fluid 302 and the vessel 301 is achieved. The smaller, more focused, polishing zone will result in a smaller contact spot $R_z$. In all other respects the embodiment depicted in FIG. 3 is the same as that depicted in FIGS. 2A and 2B.

EXAMPLE 1

The polishing of a glass lens was accomplished, using a device as shown in FIGS. 2A and 2B. The workpiece 204 had the following initial parameters:

| | |
|---|---|
| a) Glass type | BK7 |
| b) Shape | Spherical |
| c) Diameter, mm | 20 |
| d) Radius of curvature, mm | 40 |
| e) Center thickness, mm | 15 |
| f) Initial fit to shape, waves | 0.5 |
| g) Initial surface roughness, nm, rms | 100 |

A vessel 201, in which the radius of curvature of the internal wall adjacent to the electromagnet pole pieces 206 was 200 mm, was used. The radius from central axis 219 was 145 mm and the width of the vessel trough was 60 mm. The vessel 201 was filled with 300 ml of the MP-fluid 202, having the following composition:

| Component | Weight Percentage |
|---|---|
| Polirit (cerium oxide) | 10 |
| Carbonyl iron powder | 60 |
| Aerosil (fumed silica) | 2.5 |
| Glycerin | 5.5 |
| Distilled water | balance |

To determine the material removal rate, a test workpiece 204 identical to the workpiece to be polished was polished at arbitrarily chosen standard parameters. The test workpiece was attached to the workpiece spindle 205 and positioned by spindle slide 208 so that the distance between the workpiece surface to be polished and the pivot point of the rotatable table 216 (axis 214) was equal to 40 mm (the radius of curvature of the workpiece 204 surface). Using rotatable table 216, the axis of rotation of workpiece spindle 205 was set up in a vertical position where angle α=0°. The clearance h between the surface of workpiece 204 to be polished and the bottom of the vessel 201 was set at 2 mm using the table slide 217.

Both the workpiece spindle 205 and the vessel 201 were then rotated. The workpiece spindle rotation speed was 500 rpm, and the vessel rotation speed was 150 rpm. The electromagnet 206, having a magnet gap equal to 20 mm, was turned on to a level where the magnetic field intensity near the workpiece surface was about 350 kA/m. All parameters were kept constant, and the workpiece was polished for about 10 minutes, which was sufficient to create a well-defined spot.

Next, the workpiece was removed from the workpiece spindle 205. Using a suitable optical microscope, measurements were then conducted to determine the amount of material H (in μm) removed from the original surface as a function of distance R (in mm) away from the center of the workpiece. In the example described here, a Chapman Instrument MP2000 optical profiler was used to measure the amount of material removed. Depending on the metrology available, about 20 measurements are made over a 20 mm distance. In this example, 16 measurements were made over 19.7 mm. The results of these measurements for this example are plotted in FIG. 4. These results define the polishing zone for the machine set-up, and they are used as input for calculating the polishing program required to finish the workpiece. The inputs obtained in this example for calculating the polishing program are as follows:

1. Parameters of the workpiece:
   a) radius of the total sphere, $R_{sp}$, mm 39.6
   b) radius of workpiece, $R_w$, mm 24.3
2. Parameters of the polishing zone:
   a) radius of the contact spot, $R_z$, mm 17.9
   b) radius of the point where (d/dr) (dH/dr)=0, $R_d$, mm 10
   c) maximum of H, $H_{max}$, μm 21.5
   d) minimum of H, $H_{min}$, μm 0.5
3. Spatial distribution of removed material in the polishing zone:

| R, mm | H, μm |
| --- | --- |
| 0.0 | 15.2 |
| 3.3 | 19.5 |
| 5.1 | 21.5 |
| 6.4 | 20.9 |
| 7.5 | 19.2 |
| 8.9 | 16.8 |
| 10.8 | 11.9 |
| 12.4 | 9.8 |
| 13.8 | 6.7 |
| 15 | 5.1 |
| 16.2 | 3.8 |
| 17.2 | 3.0 |
| 18.2 | 1.9 |
| 18.6 | 1.3 |
| 19.3 | 1.3 |
| 19.7 | 0.5 |

Using these inputs, the polishing required to finish the workpiece is determined. In a preferred embodiment of the present invention, a computer program is used to calculate the necessary parameters and control the polishing operation. Determination of the polishing requirements includes determination of the number of steps for changing angle α, the value of angle α for each step, and the dwell time for each step in order to maintain constant the material removal over the surface of the workpiece by overlapping polishing zones, as described above.

The parameters of the workpiece, parameters of the polishing zone, and spatial distribution of removed material in the polishing zone given above for this example are used to control the system during the polishing method. In this example, the results were entered into a computer program for this purpose. The results of the calculations were as follows:

TABLE 1

| Angle, α | Time coefficient | Control radiuses, mm |
| --- | --- | --- |
| 0.00 | 1.000 | 0.00 |
| 1.79 | 1.000 | 1.25 |
| 3.58 | 1.000 | 2.49 |
| 5.37 | 1.000 | 3.74 |
| 7.16 | 1.000 | 4.98 |
| 8.95 | 1.000 | 6.22 |
| 10.74 | 1.208 | 7.45 |
| 12.53 | 1.208 | 8.68 |
| 14.32 | 1.208 | 9.89 |
| 16.11 | 1.416 | 11.10 |
| 17.90 | 1.624 | 12.29 |
| 19.70 | 1.832 | 13.48 |
| 21.49 | 2.040 | 14.65 |
| 23.28 | 2.040 | 15.81 |
| 25.07 | 2.040 | 16.95 |
| 26.86 | 1.624 | 18.07 |
| 28.65 | 1.832 | 19.18 |
| 30.44 | 38.119 | 20.26 |

As used here, the control radius represents the relative position of the polishing zone with respect to the central vertical axis of the workpiece. The control radius is determined by the angle α; during polishing it is the angle α, rather than the control radius, that is controlled.

The dwell times for each angle are then converted to minutes by multiplying the time coefficients in table 1 by a constant factor. The constant factor used to convert the time coefficients to dwell times will depend upon the characteristics of the workpiece. For the example given here, this constant was empirically determined to be 5 minutes.

Using the results from table 1, the programmable controller 212 was programmed. The workpiece 204 to be polished was attached to the workpiece spindle 205, and the procedure described for the test workpiece was repeated under the automatic control of the programmable controller 212. The following results were obtained.

Results of Polishing

Final fit to shape, waves 1

Final roughness, μm 0.0011

In addition to the embodiments described above, there are numerous alternate embodiments of the device of the present invention. Some of these alternate embodiments are shown in FIGS. 9 through 30. As illustrated by these figures, only a magnetorheological fluid, a means for inducing a magnetic field, and a means for moving the object to be polished or the means for inducing the magnetic field relative to one another are required to construct a device according to the present invention. For example, FIGS. 9 through 11 illustrate an embodiment of the invention in which the magnetorheological fluid is not contained within a vessel.

Figure 9:
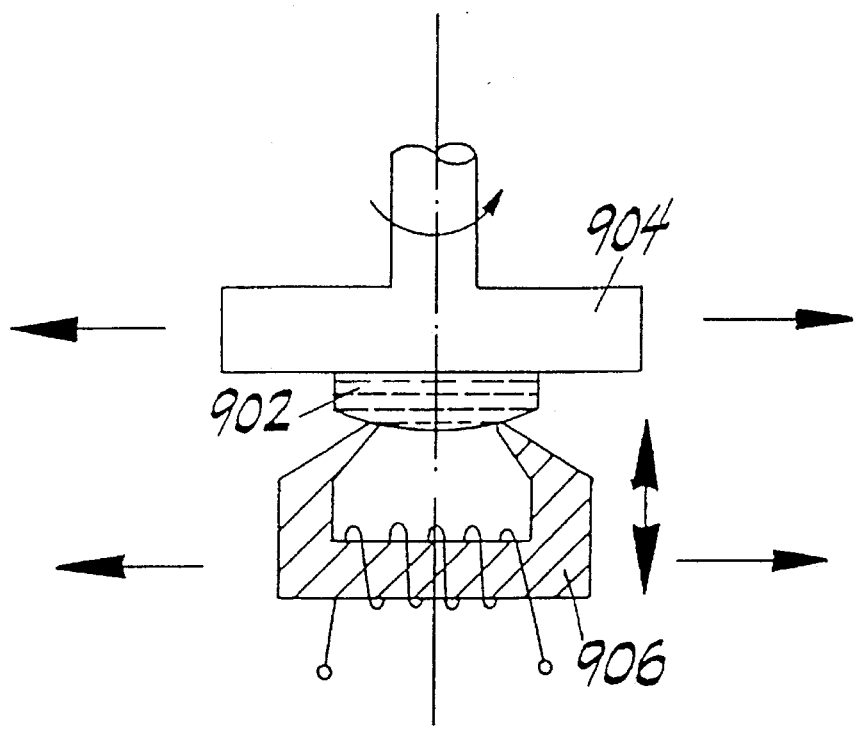
FIG. 9 is a cross-sectional side view of another embodiment of the invention.

In FIG. 9, an MP-fluid 902 is placed at the poles of an electromagnet 906. Electromagnet 906 is positioned so that the magnetic field that it creates acts only upon a particular surface section of the object to be polished 904, thereby creating a polishing zone. In operation, object 904 is put into rotation. Either electromagnet 906, or object 904, or both electromagnet 906 and object 904, are then moved such that step-by-step the entire surface of the object is polished. Electromagnet 906, object to be polished 904, or both, may be displaced relative to each other in the vertical and/or horizontal planes. During polishing the magnetic field strength is also regulated, as required, to polish the object 904. Rotation of the object 904, movement of the electromagnet 906 and/or the object 904, and regulation of the magnetic field strength according to a predetermined program of polishing permits controlled removal of material from the surface of the object to be polished 904.

Figure 10:
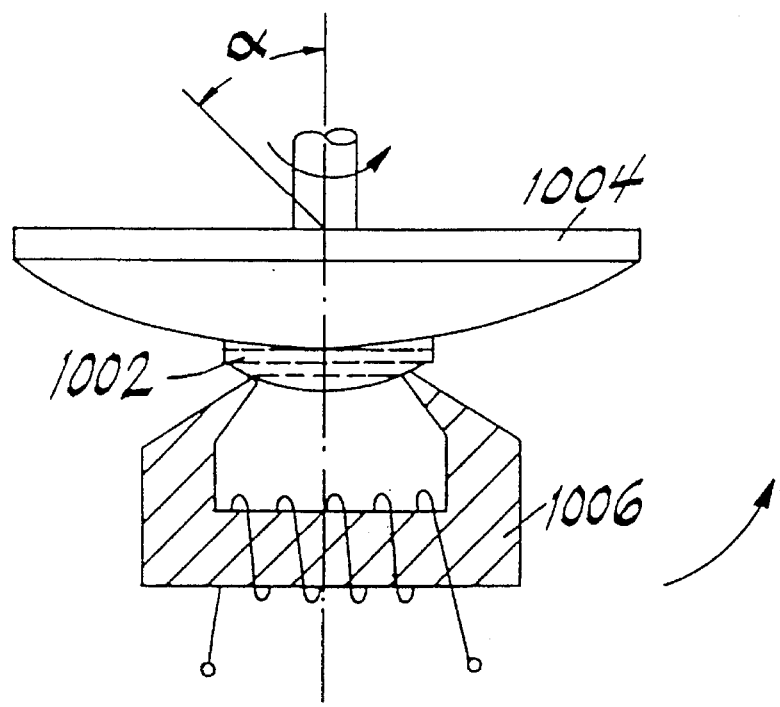
FIG. 10 is a cross-sectional side view of another embodiment of the invention.

FIG. 10 illustrates a device for polishing curved surfaces. In FIG. 10, an MP-fluid 1002 is placed at the poles of electromagnet 1006. The electromagnet 1006 is configured such that it generates a magnetic field affecting only some surface section of an object to be polished 1004. Object to be polished 1004, which has a spherical or aspherical surface, is put into rotation. Electromagnet 1006 is displaced to an angle α along the trajectory which corresponds to the radius of curvature of the object 1004, as indicated by the arrows in FIG. 10, such that the electromagnet is moved parallel to the surface of the object, according to a predetermined program of polishing, thus controlling material removal along the part surface.

Figure 11:
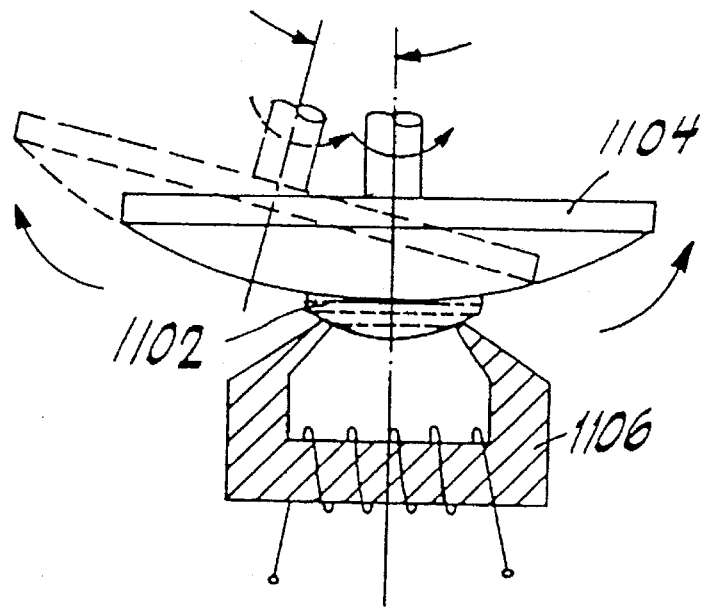
FIG. 11 is a cross-sectional side view of another embodiment of the invention.

In FIG. 11, an MR-fluid 1102 is also placed at the poles of electromagnet 1106. The electromagnet is configured such that it generates a magnetic field acting only upon some surface section of the object to be polished 1104. In operation, an object to be polished 1104 having a spherical or aspherical surface is put into rotation. The object to be polished 1104 is then rocked, such that an angle α, indicated on FIG. 11, varies from 0 to a value which depends upon the size and shape of the workpiece. Rocking the workpiece 1104 relative to the electromagnet 1106, thus varying the angle α, according to a predetermined program of polishing, controls material removal along the surface of the object to be polished.

Figure 12:
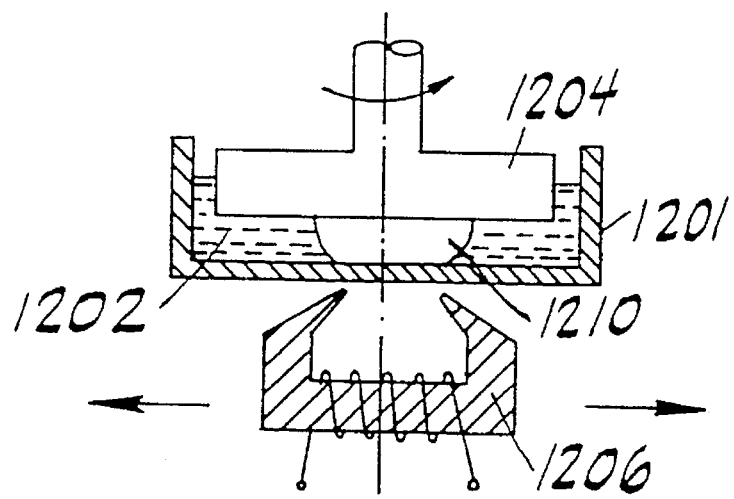
FIG. 12 is a cross-sectional side view of another embodiment of the invention.

In FIG. 12, MR-fluid 1202 is placed into a vessel 1201. An electromagnet 1206 is positioned beneath vessel 1201 and configured such that the electromagnet 1206 initiates a magnetic field which acts only upon a section, or polishing zone 1210, of the MP-fluid 1202 in the vessel 1201. The MP-fluid in the polishing zone 1210 acquires plastic properties for effective material removal in the presence of a magnetic field. Object to be polished 1204 is put into rotation, and electromagnet 1206 is displaced along the surface to be polished. The workpiece may then be polished according to a predetermined program which controls material removal along the surface of the object to be polished.

Figure 13:
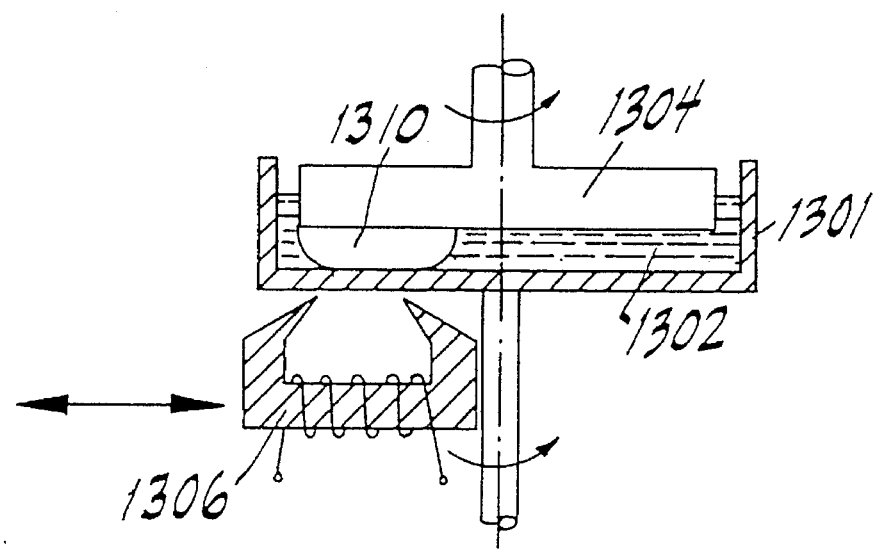
FIG. 13 is a cross-sectional side view of another embodiment of the invention.

In FIG. 13, an MP-fluid 1302 is placed into a vessel 1301. Electromagnet 1306 is configured such that it induces a magnetic field acting only upon a section, or polishing zone 1310, of the MP-fluid 1302. The MP-fluid 1302 thus acts only upon the section of the object to be polished 1304 positioned in the polishing zone 1310. Object to be polished 1304 and vessel 1301, with their axes coinciding, are put into rotation at the same or different speeds in the same or opposite directions. Displacing electromagnet 1306 radially along the vessel surface according to an assigned program displaces the polishing zone 1310, and controls material removal along the surface of the object to be polished.

Figure 14:
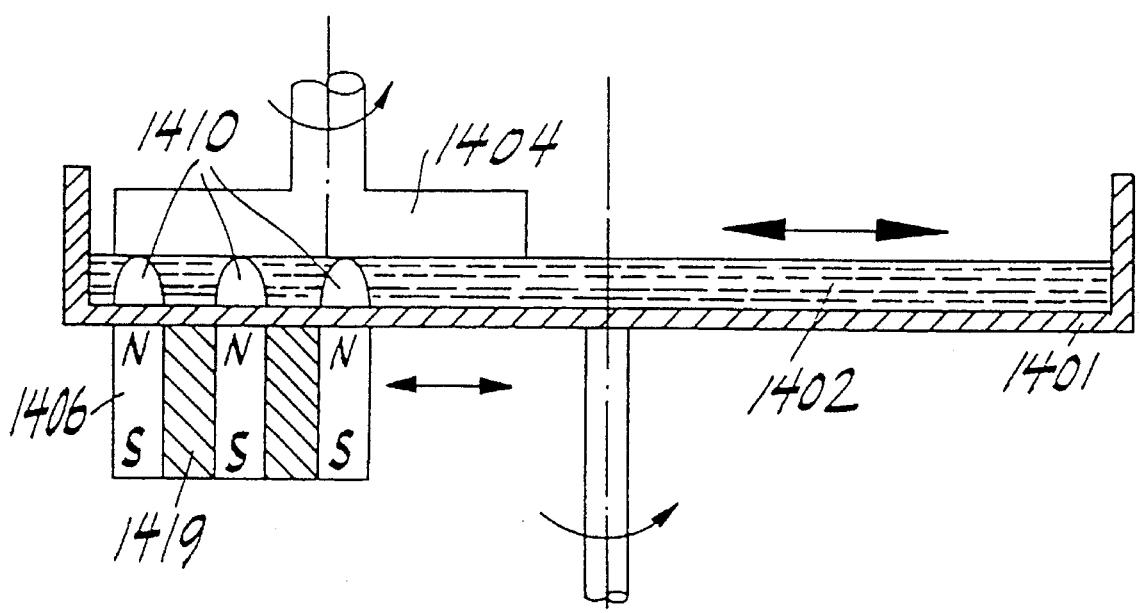
FIG. 14 is a cross-sectional side view of another embodiment of the invention.

In FIG. 14, an MP-fluid 1402 is placed into a vessel 1401. A casing 1419 which contains a system of permanent magnets 1406 is set under the vessel 1401. An electromagnetic field created by each magnet 1406 affects only a section, or polishing zone 1410, of the object to be polished. In operation, object to be polished 1404 and vessel 1401 are simultaneously put into rotation. The rotation axes of object to be polished 1404 and vessel 1401 are eccentric relative to each other. The casing 1419, or the object to be polished 1404, or both, are simultaneously displaced according to a predetermined program of polishing, thus controlling material removal along the object to be polished surface.

Figure 15:
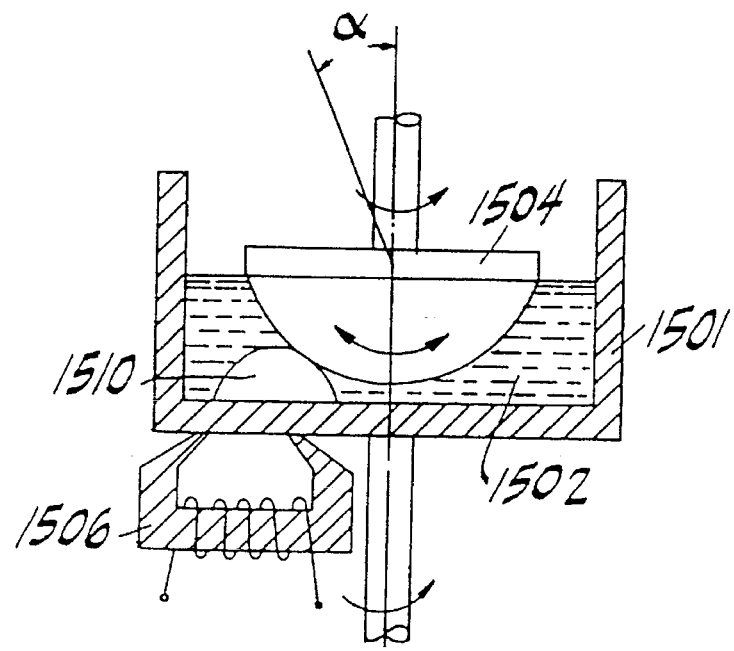
FIG. 15 is a cross-sectional side view of another embodiment of the invention.

In FIG. 15, an MP-fluid 1502 is placed into a vessel 1501. Electromagnet 1506 is positioned under the vessel such that its magnetic field affects only a section, or polishing zone 1510, of the MP-fluid 1502 in the vessel 1501. Object to be polished 1504, which has a spherical or curved shape, and vessel 1501 are put in rotation in the same or opposite directions. While polishing, object 1504 is rocked such that an angle α, indicated on FIG. 15, varies from 0 to a value which depends upon the size and shape of the object 1504. The rotation of the object 1504 and the vessel 1501, and the angle α, are controlled according to a predetermined program of polishing. As a result, material removal along the surface of the object to be polished is controlled.

Figure 16:
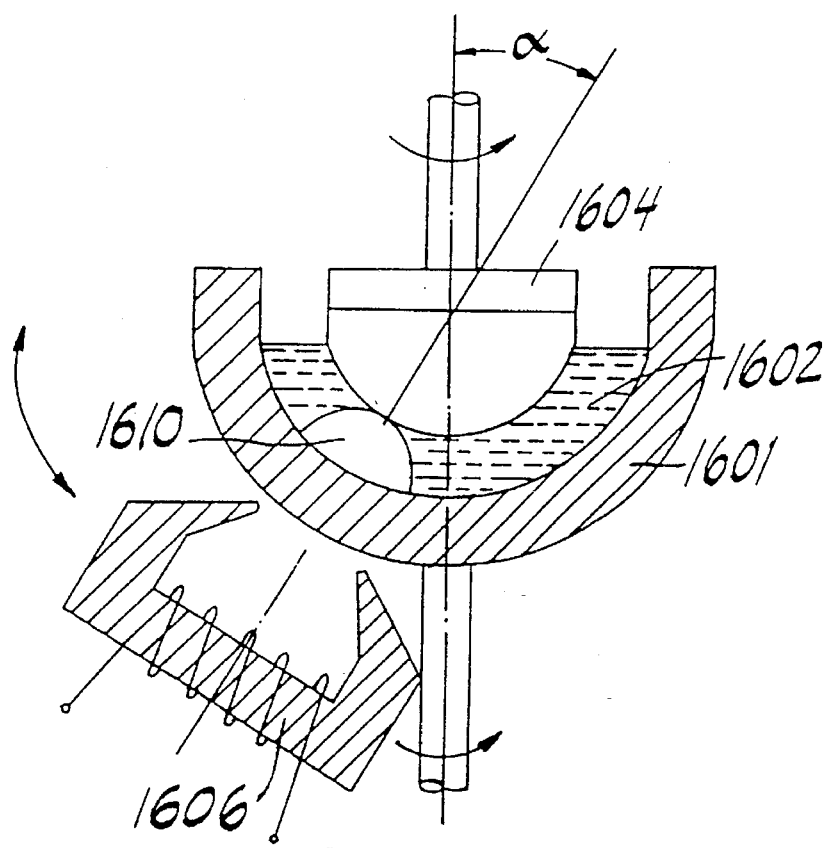
FIG. 16 is a cross-sectional side view of another embodiment of the invention.

In FIG. 16, an MP-fluid 1602 is placed into a longitudinal vessel 1601. The shape of the inner cavity of the vessel 1601 is chosen to parallel the surface of the object 1604, such that the inner wall of the vessel is equi-distant from the generatrix of object 1604 at α=0. An electromagnet 1606 is positioned below the vessel 1601 such that it induces a magnetic field in a section, or polishing zone 1610, of the MP-fluid 1602. In operation, the electromagnet 1606 is displaced along the bottom of the vessel 1601 while the object 1604 and the vessel 1601 are rotating. The object is also rocked to an angle α during the polishing program. Rotation of the object 1604 and vessel 1601, movement of the electromagnet 1606, and rocking the object 1604 according to a predetermined program of polishing permits controlled removal of material from the surface of the object to be polished 904.

In FIG. 17, MP-fluid 1702 is placed into a circular vessel with an annular cavity 1701. Electromagnet 1706 is positioned under the vessel 1701. Electromagnet 1706 is chosen such that its magnetic field affects a section, or polishing zone 1710, of the MP-fluid 1702. Object to be polished 1704 and vessel 1701 are put into rotation in the same or opposite directions at equal or different speeds. Displacing electromagnet 1706 radially along the bottom of the annular cavity of the vessel 1701, according to a program of polishing, controls material removal along the surface of the object to be polished 1704.

In FIG. 18, an MP-fluid 1802 is placed into a circular vessel with an annular cavity 1801. The vessel bottom is coated with a nap material 1815, which hinders slippage of the MP-fluid 1802 relative to the vessel bottom 1801, and enhances the rate of material removal from the surface of the object. Electromagnet 1806 is mounted under the vessel cavity 1801. The pole pieces of the electromagnet 1806 are chosen such that its field will affect only a section, or polishing zone 1810, of the MP-fluid, and therefore it will only affect a portion of the surface of the object to be polished 1804.

The object to be polished 1804, the longitudinal vessel 1801, or both, are put into rotation at the same or different speeds, in the same or opposite directions. Electromagnet 1806 is also displaced relative to the surface of the object to be polished 1804 according to a program of polishing.

In FIG. 19, MP-fluid 1902 is placed into an annular cavity in a circular vessel 1901. The radius of curvature of the vessel cavity is chosen to correspond to the desired radius of curvature of the object 1904 after polishing, such that the inner wall of the cavity 1901 will equi-distant to the surface of the polished object 904. Object to be polished 1904, which is mounted on a spindle 1905, and vessel 1901 are put into rotation at equal or different speeds in the same or opposite directions. Electromagnet 1906 is displaced along the bottom of the vessel cavity 1901 according to a predetermined program, thus controlling material removal along the surface of the object to be polished.

In FIGS. 20A and 20B, the MP-fluid 2002 is also placed into a circular vessel with an annular cavity 2001. An electromagnet 2006 is mounted under the vessel 2001. The pole pieces of the electromagnet 2006 are chosen such that its field will affect only a section, or polishing zone 2010, of the MP-fluid 2002, and therefore will affect only a surface section of the object to be polished 2004.

Object to be polished 2004 and the vessel 2001 are put into rotation at the same or different speeds in the same or opposite directions. The object to be polished 2004 is also rocked, or swung, relative to the vessel. The object is rocked from a vertical position to an angle α during polishing according to a predetermined program, thereby controlling material removal along the surface to be polished.

Figure 21B:
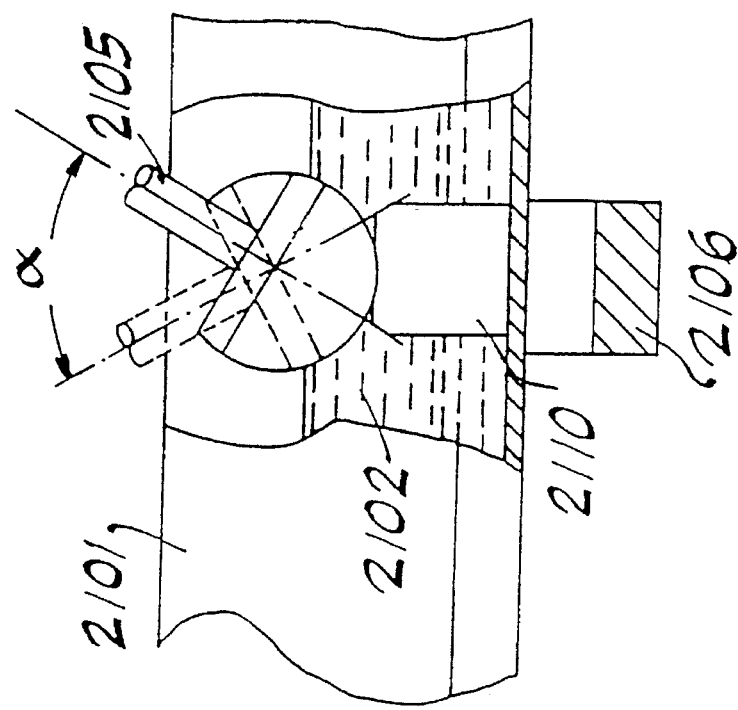
FIG. 21B is a cross-section front view of the apparatus of FIG. 21A.
Figure 21A:
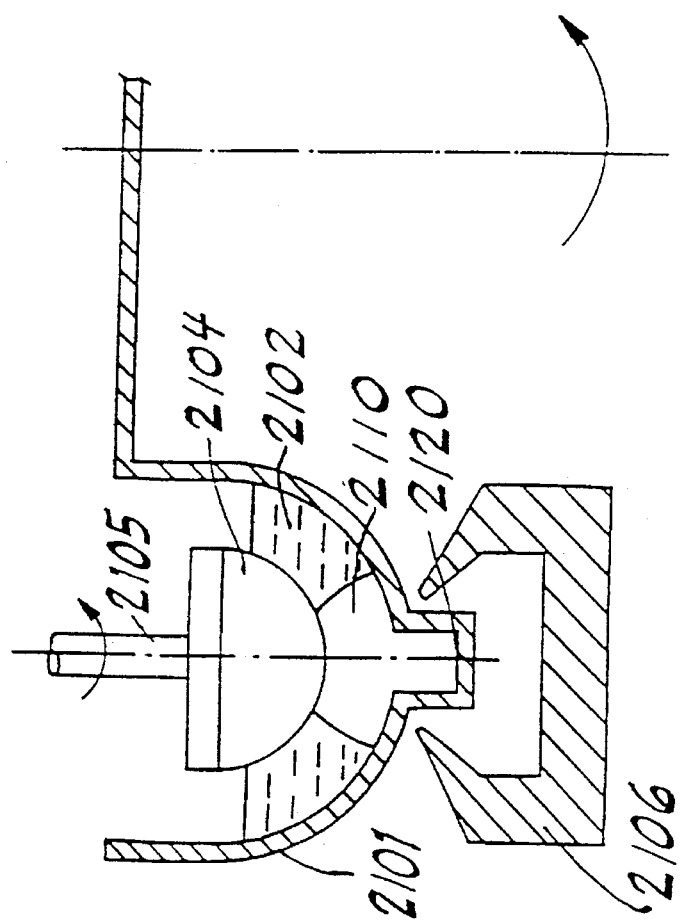
FIG. 21A is a cross-sectional side view of another embodiment of the invention.

In FIGS. 21A and 21B, an MP-fluid 2102 is placed in a circular vessel 2101 with an annular cavity having a valley 2120. The pole pieces of electromagnet 2106 are chosen such that its magnetic field will affect only a portion, or polishing zone 2110, of the MP-fluid 2101. In FIG. 21, the portion of the MP-fluid 2102 affected by the magnetic field is located within, or above, the valley 2120.

An object to be polished 2104 is put into rotation. The object to be polished 2104 is also rocked, or swung, relative to its axis normal to the vessel rotation plane to an angle α, according to an assigned program, thus controlling material removal along the surface of the object to be polished.

Figure 22:
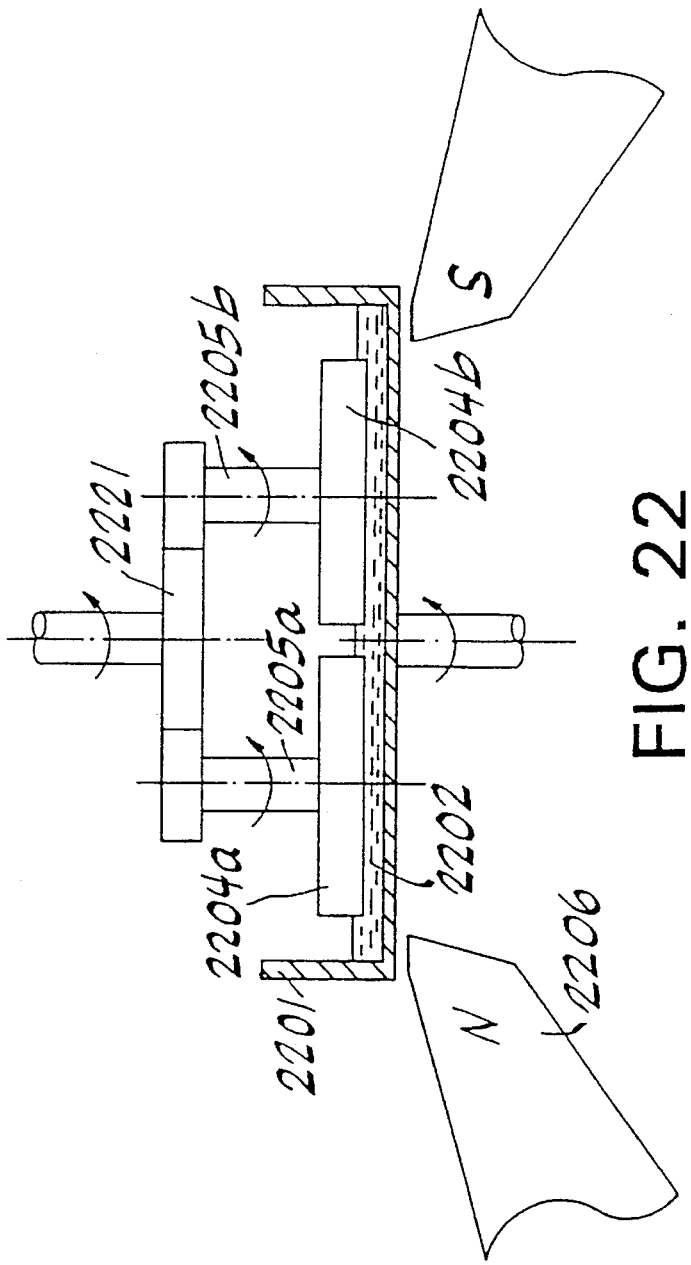
FIG. 22 is a cross-sectional side view of another embodiment of the Invention.

In FIG. 22, an MP-fluid 2202 is placed into a cylindrical vessel 2201. Objects to be polished 2204a, 2204b, etc. are fixed on spindles 2205a, 2205b, etc., which are, mounted on a disc 2221 capable of rotating in the horizontal plane. An electromagnet 2206 is installed under the vessel such that it creates a magnetic field along the entire surface of vessel 2201.

Disc 2221, vessel 2201, and objects to be polished 2204a, 2204b, etc. are put into rotation in the same or opposite directions with equal or different speeds. By regulating the magnetic field intensity and the rotation of the disc, the vessel, and the objects, the rate of removal of material from the surface of the object to be polished is controlled.

Figure 23:
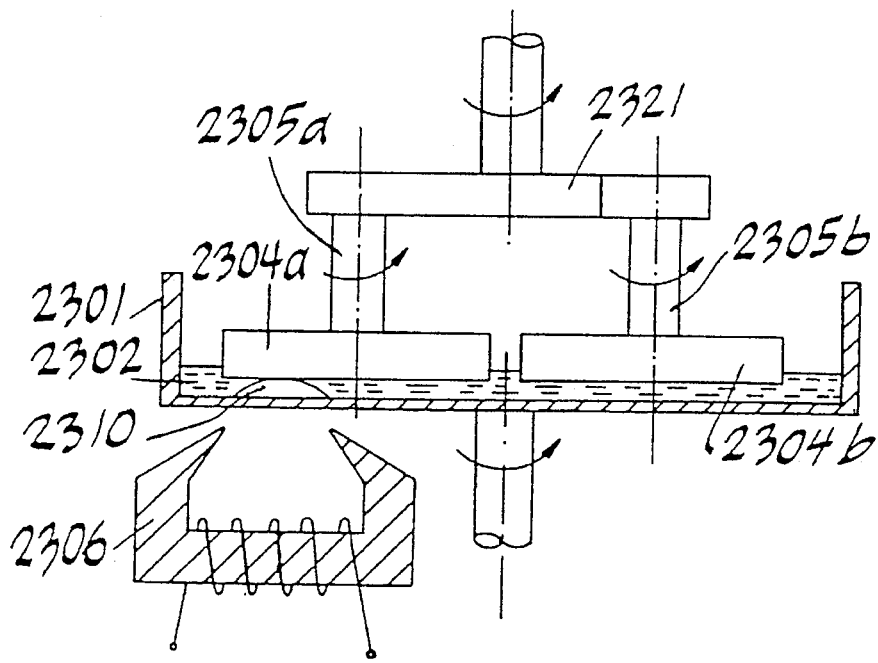
FIG. 23 is a cross-sectional side view of another embodiment of the invention.

In FIG. 23, an MP-fluid 2302 is placed into a vessel 2301. An electromagnet 2306 is installed below the vessel bottom. The pole pieces of the electromagnet are chosen such than it will create a magnetic field which acts only upon a portion, or polishing zone 2310, of the MP-fluid 2302 in the vessel 2301. Objects to be polished 2304a, 2304b, etc. are mounted on spindles 2305a, 2305b, etc., which are capable of rotating relative to a disc 2321 on which they are installed. Disc 2321 is also capable of rotating relative to vessel 2301.

Disc 2321, objects to be polished 2304a, 2304b, etc., and vessel 2301 are put into rotation at equal or different speeds, in the same or opposite directions. Electromagnet 2306 is also radially displaced along the surface of the vessel. This rotation, and displacing electromagnet 2306 along the vessel surface, are regulated to control material removal from the surface of the object to be polished.

Figure 24:
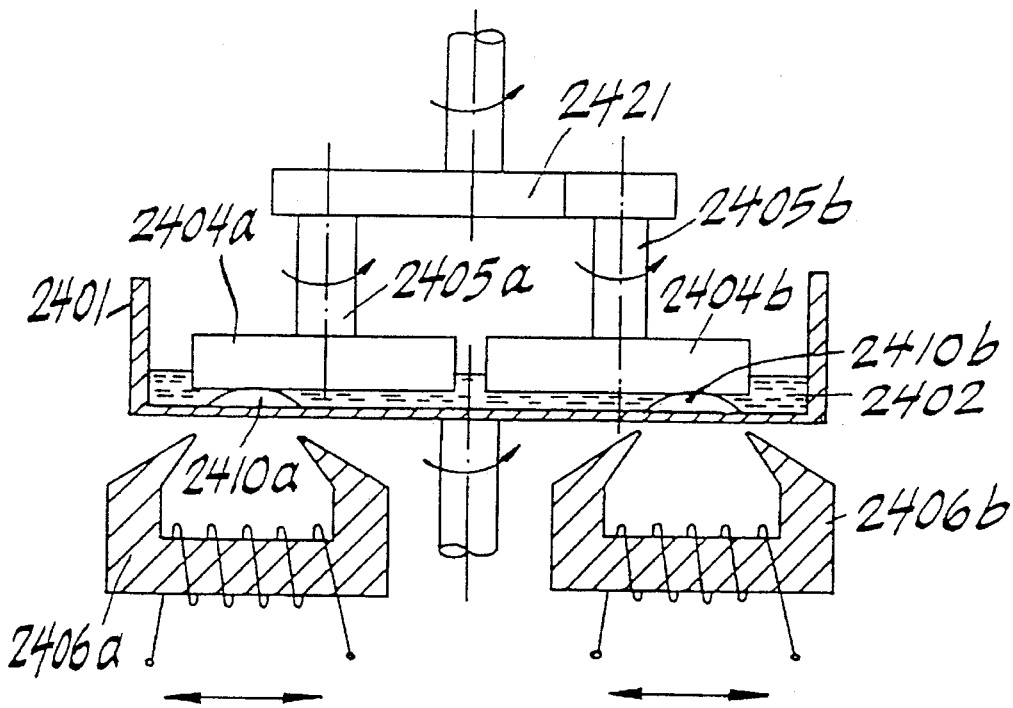
FIG. 24 is a cross-sectional side view of another embodiment of the invention.

In FIG. 24, an MP-fluid 2402 is placed into a vessel 2401. Electromagnets 2406a, 2406b, etc. are mounted near the vessel bottom. The pole pieces of electromagnets 2406a, 2406b, etc. are chosen such that each will create a field acting only upon a section, or polishing zone 2410a, 2410b, etc., of the vessel fluid 2402. Objects to be polished 2404a, 2404b, etc. are mounted on spindles 2405a, 2405b, etc. which are capable of rotating relative to a disc 2421 on which they are installed. Disc 2421, objects to be polished 2404a, 2404b, etc. and vessel 2401 are put into rotation with equal or different speeds, in the same or opposite directions. Electromagnets 2406a, 2406b, etc. are also radially displaced along the bottom surface of the vessel 2401. This rotation, and displacing electromagnets 2406a, 2406b, etc. along the vessel surface, are regulated to control material removal from the surface of the object to be polished.

Figure 25A:
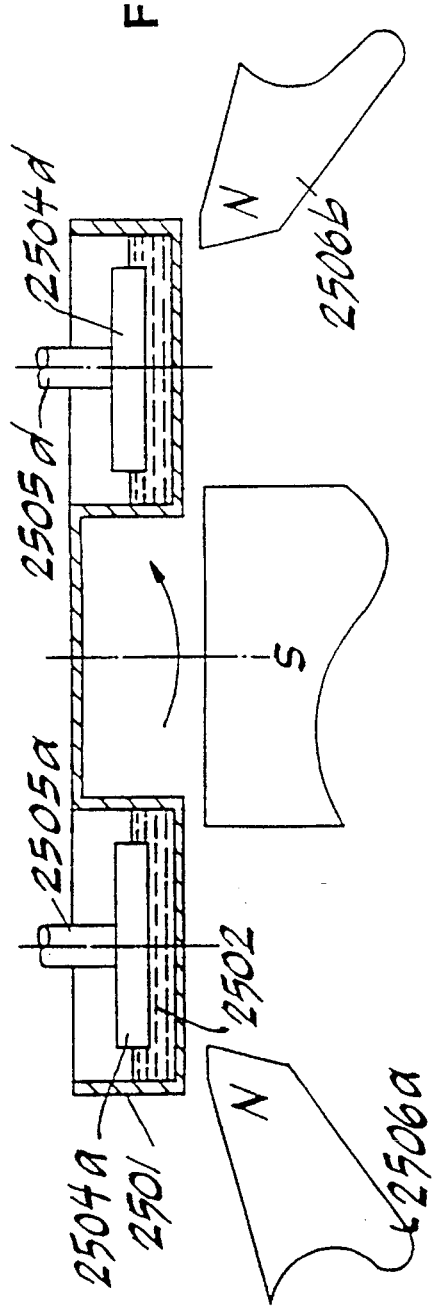
FIG. 25A is a cross-sectional side view of another embodiment of the invention.
Figure 25B:
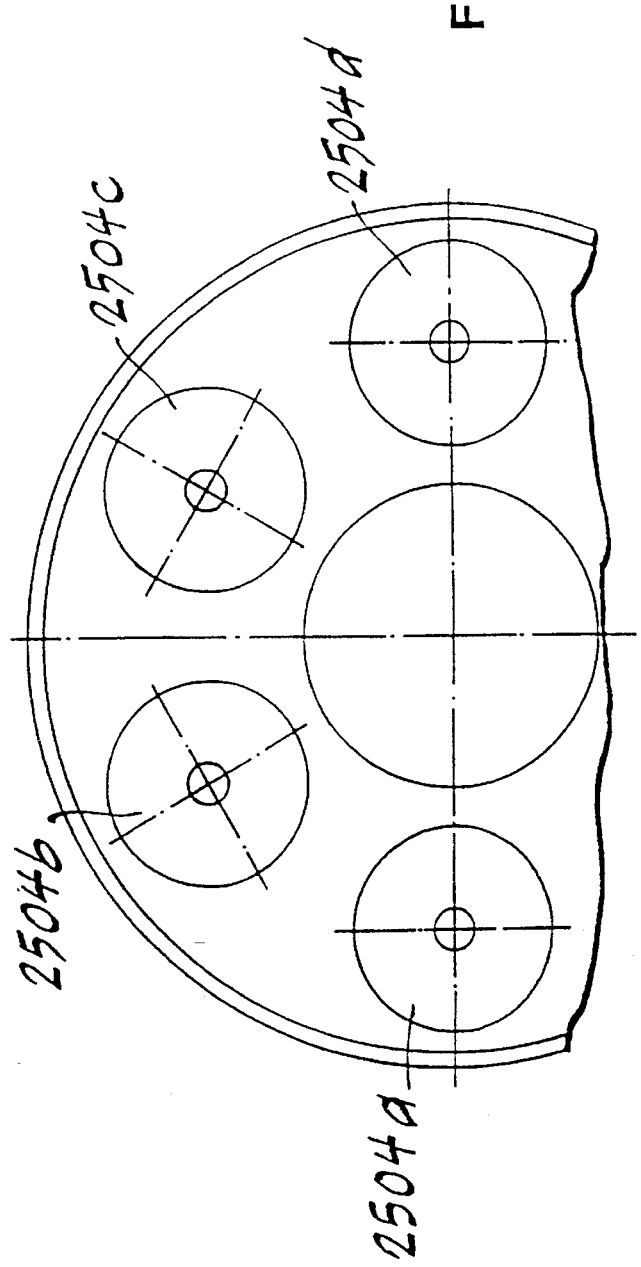
FIG. 25B is a partial top plan view of the apparatus of FIG. 25A.

In FIGS. 25A and 25B, an MP-fluid 2502 is placed into a circular vessel 2501 with an annular cavity. Objects to be polished 2504a, 2504b, etc. are mounted on spindles 2505a, 2505b, etc. Electromagnets 2506a, 2506b, etc. are mounted under the vessel 2501 such that the electromagnet-induced magnetic field will affect the entire volume of the MP-fluid, and thus the entire surface of the objects to be polished. Vessel 2501 and objects to be polished 2504a, 2504b, etc. are rotated in the same or opposite directions, with equal or different speeds. The electromagnet-induced magnetic field intensity is also controlled. This results in controlled material removal from the surface of the object to be polished.

Figure 26A:
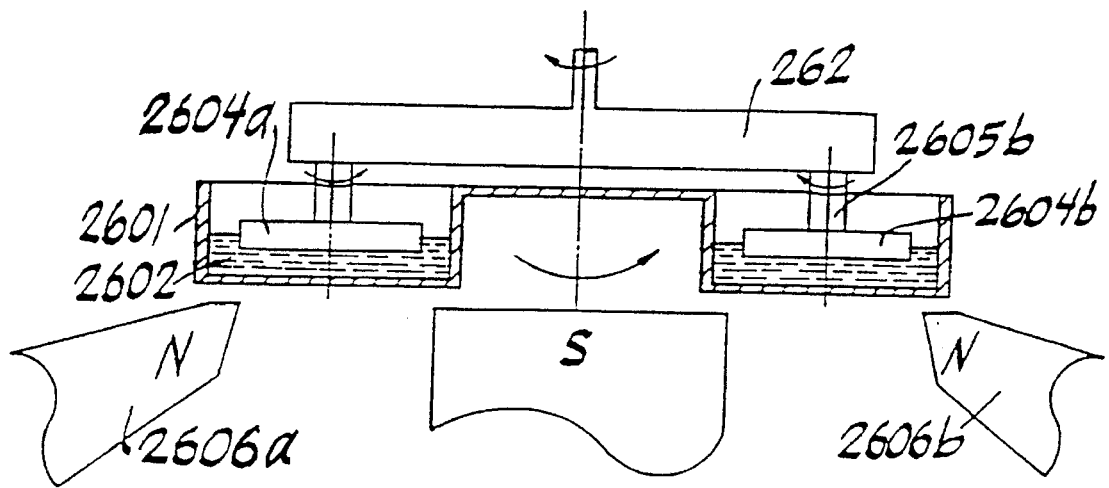
FIG. 26A is a cross-sectional side view of another embodiment of the invention.
Figure 26B:
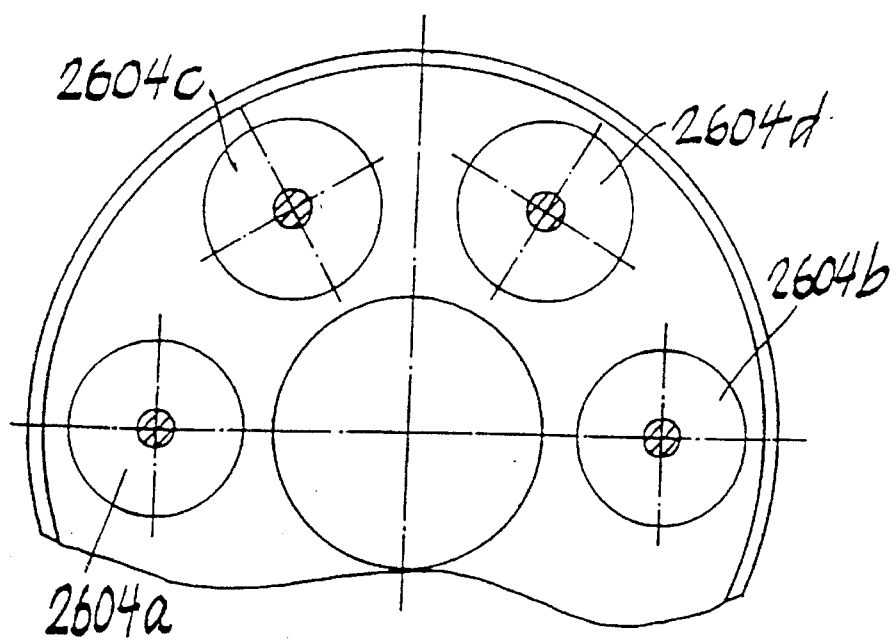
FIG. 26B is a partial top plan view of the apparatus of FIG. 26A.

In FIGS. 26A and 26B, an MP-fluid 2602 is placed into a circular vessel 2601 with an annular cavity. Objects to be polished 2604a, 2604b, 2604c, 2604d, etc. are mounted on spindles 2605a, 2605b, 2605c, 2605d, etc., which are installed on a disc 2621 which is capable of rotating in the horizontal plane.

Electromagnets 2606a, 2606b, etc. are installed under the vessel surface. The pole pieces of the electromagnets are chosen such that the electromagnets will create a magnetic field over the entire vessel width.

Rotating vessel 2601, disc 2621, and objects to be polished 2604a, 2604b, 2604c, 2604d, at equal or different speeds, in the same or different directions, controls the material removal rate for a given magnetic field intensity.

Figure 27:
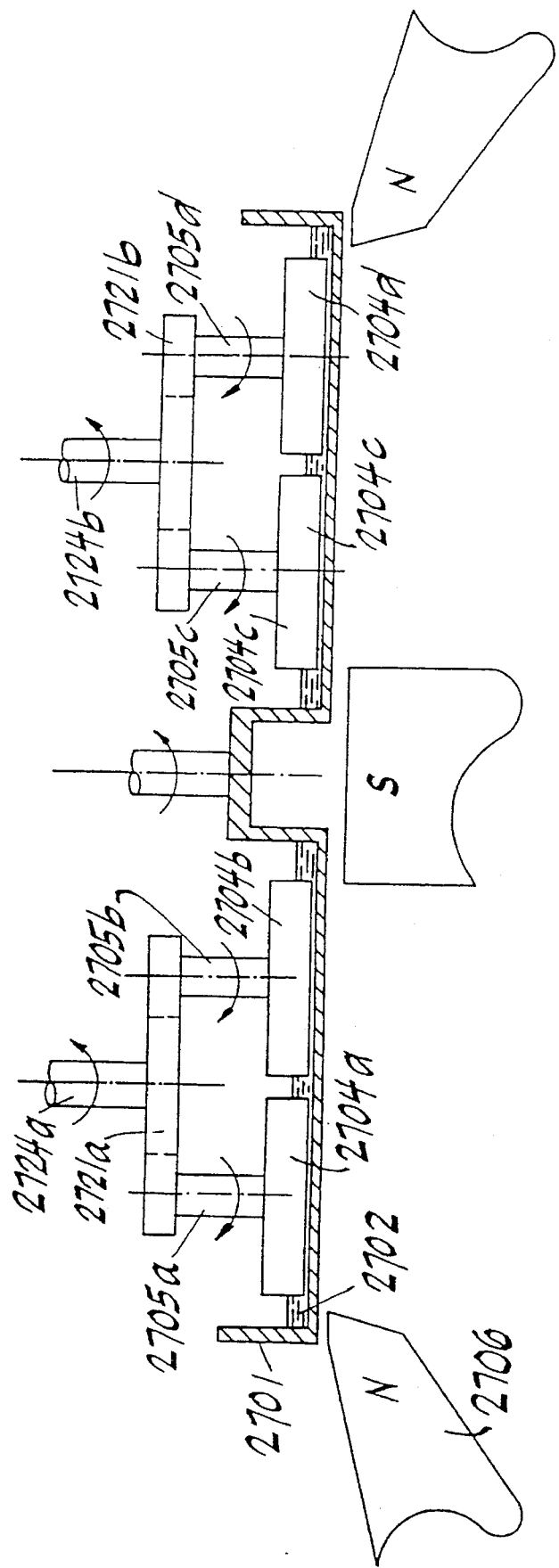
FIG. 27 is a cross-sectional side view of another embodiment of the invention.

In FIG. 27, an MP-fluid 2702 is placed into a circular vessel 2701 having an annular cavity. An electromagnet 2706 induces a magnetic filed along the entire surface of vessel 3501. Objects to be polished 2704a, 2704b, 2704c, 2704d, etc. are mounted on spindles 2705a, 2705b, 2705c, 2705d, etc. Spindles 2705a, 2705b, 2705c, 2705d, etc. are mounted on discs 2721a, 2721b, etc., which are capable of rotating in a horizontal plane. Discs 2721a, 2721b, etc. are mounted on spindles 2724a, 2724b, etc. This figure illustrates one design for simultaneously polishing numerous objects.

Figure 28:
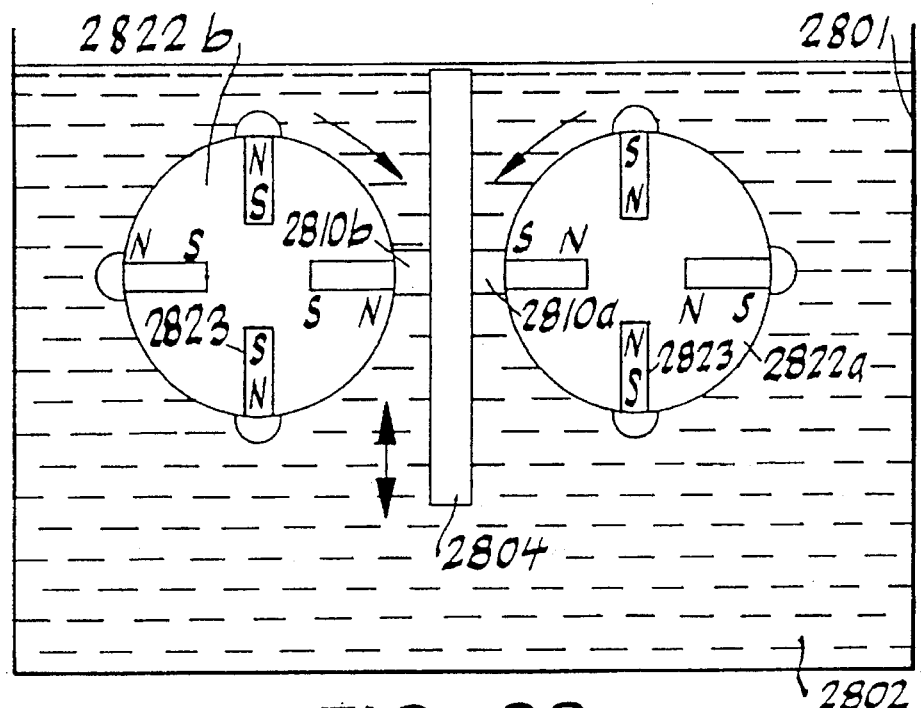
FIG. 28 is a cross-sectional side view of another embodiment of the invention.

In FIG. 28, an MP-fluid 2802 is placed into vessel 2801. Two units 2822a and 2822b equipped with permanently mounted magnets 2823 are installed inside the vessel 2801.

A flat object to be polished 2804 is mounted between units 2822a and 2822b. Units 2822a and 2822b are rotated about their horizontal axes. These units are rotated at the same speed such that a magnetic field, and polishing zones 2810, will be created when different-sign poles are on the contrary with each other. Object to be polished 2804 is moved in such a way that polishing zones are created for both object surfaces. The material removal rate is controlled by the rotation speed of units 2822a, 2822b and the speed at which the object 2804 is vertically displaced.

Figure 29:
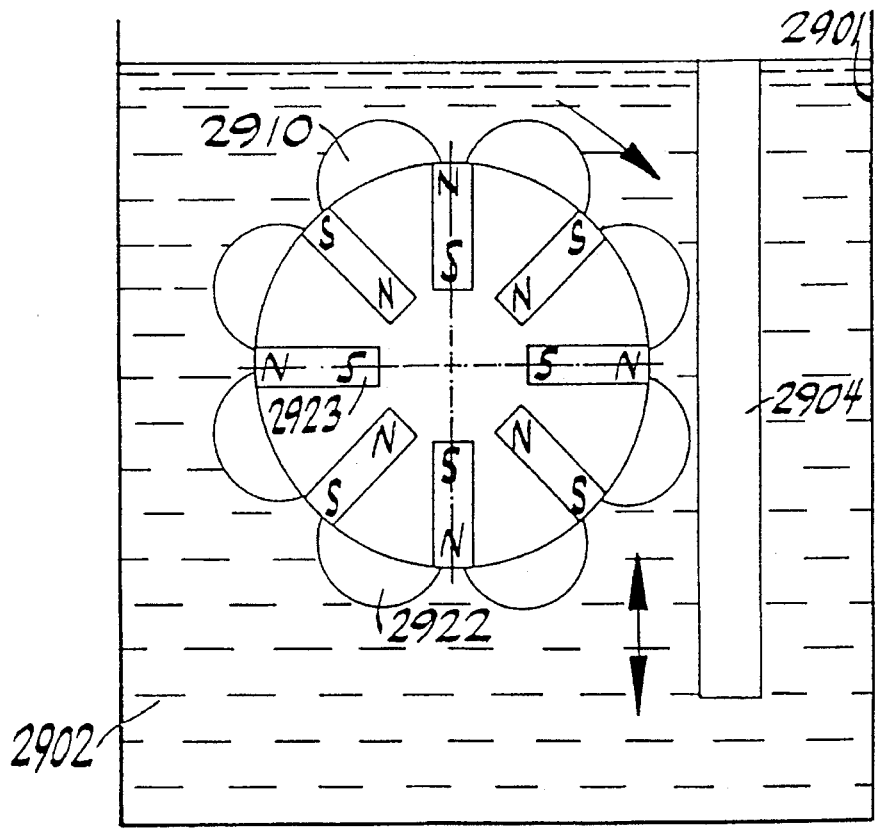
FIG. 29 is a cross-sectional side view of another embodiment of the invention.

In FIG. 29, an MP-fluid 2902 is placed into vessel 2901. Units 2922 equipped with magnets 2923 are mounted inside vessel 2901 and are capable of rotating along the axis normal to the displacement direction of the object to be polished 2904. The magnets are mounted in the unit so that the permanent magnets mounted side by side would have different-sign poles relative to each other, so as to create a polishing zone 2910 between the magnets.

The polishing is carried out by rotating unit 2922 and giving a scanning motion to object to be polished 2904 in the vertical plane. The material removal rate is controlled by changing the rotational speeds of units 2922 and the speed at which object to be polished 2904 is displaced.

Figure 30:
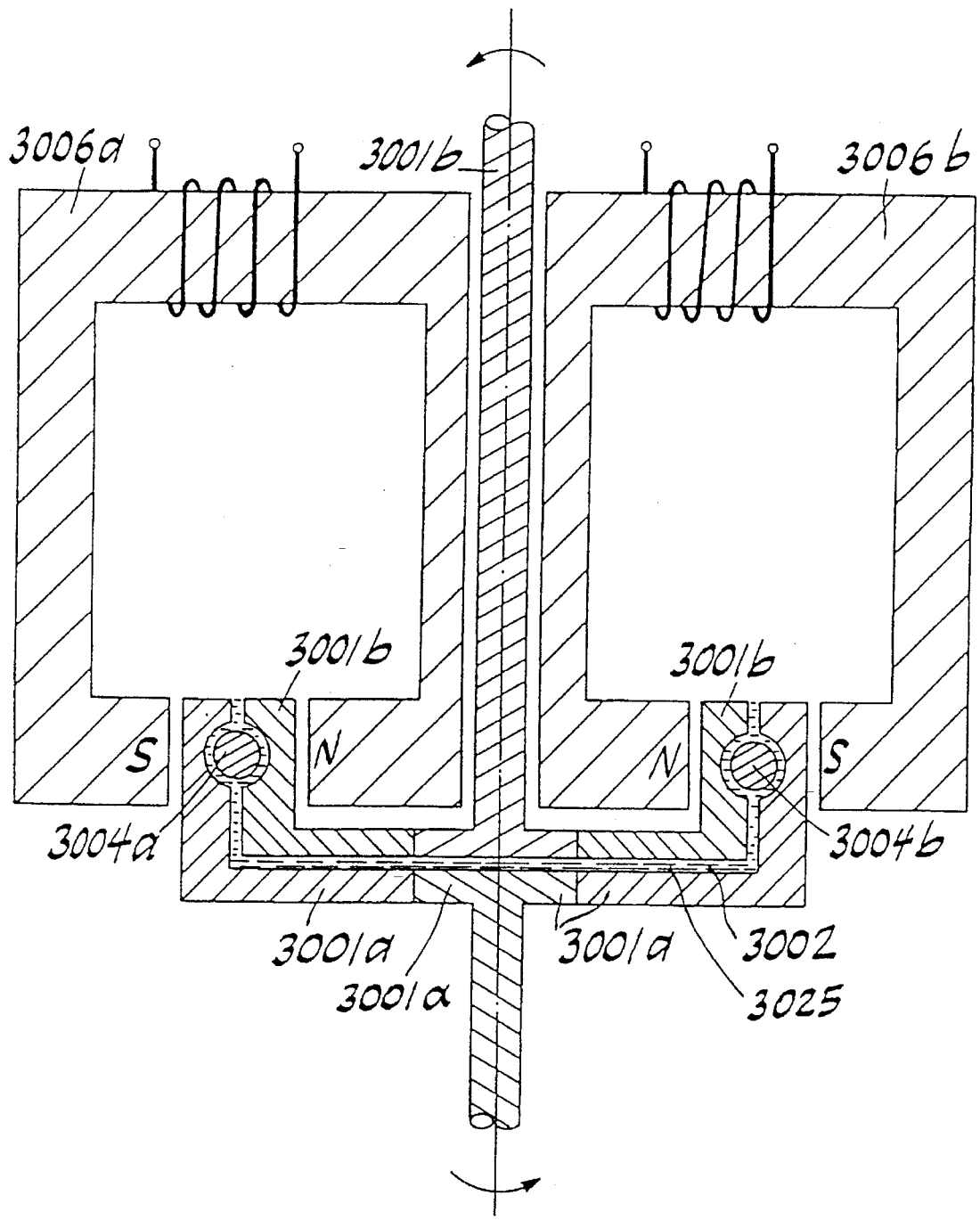
FIG. 30 is a cross-sectional side view of another embodiment of the invention.

FIG. 30 illustrates an apparatus for polishing spherical objects. The objects 3004a, 3004b, etc. are placed in a channel 3025 formed between a top vessel 3001b and a bottom vessel 3001a. The channel 3025 is filled with an MP-fluid 3002, which is affected by a magnetic field induced by an electromagnet 3006. In operation, top vessel 3001a and bottom vessel 3001b are rotated counter to one another. The rotation of the MP-fluid 3002 with the vessels 3001a and 3001b causes the spherical objects to be polished.

What is claimed is:

1. A method of finishing a workpiece surface using magnetorheological fluid, comprising:

positioning the workpiece at a clearance from a surface adapted to carry magnetorheological fluid;

introducing a flow of magnetorheological fluid through said clearance;

applying a magnetic field substantially at said clearance to create a polishing or work zone in the magnetorheological fluid, said zone forming a transient tool for engaging and causing material removal at a portion of the workpiece surface, said zone engaging said workpiece surface at an area smaller than the area of the workpiece surface to be finished; and moving the workpiece or the zone relative to the other to expose different portions of the workpiece surface to the zone for predetermined dwell times to selectively finish said portions of said workpiece surface to predetermined degrees.

2. The method of claim 1, wherein at least a portion of said clearance decreases in height from a first section to a second section, and said magnetorheological fluid flows through said clearance in a direction from said first section to said second section.

3. The method of claim 1, wherein said magnetorheological fluid comprises non-magnetic abrasive particles to enhance material removal at the workpiece surface.

4. The method of claim 1, further comprising the step of recirculating magnetorheological fluid having flowed through said clearance by reintroducing the fluid through said clearance.

5. The method of claim 4, further comprising the step of stirring magnetorheological fluid having flowed through said clearance.

6. The method of claim 5, wherein said magnetorheological fluid includes a carrier fluid and further comprising the step of adding carrier fluid to the magnetorheological fluid to replace evaporated carrier fluid.

7. The method of claim 1, wherein said step of introducing a flow of magnetorheological fluid through said clearance comprises depositing magnetorheological fluid on the surface adapted to carry magnetorheological fluid and moving said surface relative to the workpiece to force magnetorheological fluid to flow through the clearance.

8. The method of claim 7, wherein said surface adapted to carry magnetorheological fluid comprises a bottom surface of a donut-shaped trough, and wherein said step of moving the surface adapted to carry magnetorheological fluid comprises rotating the trough.

9. The method of claim 1, wherein said step of applying a magnetic field comprises the step of maximizing the magnetic field at the clearance.

10. The method of claim 1, further comprising the step of rotating the workpiece relative to the zone.

11. The method of claim 1, wherein said workpiece is mounted on a pivoting workpiece holder and said step of moving the workpiece or the zone relative to the other comprises pivoting the workpiece holder to sweep the surface of the workpiece across the zone.

12. The method of claim 1, wherein said step of moving the workpiece or the zone relative to the other comprises moving the workpiece along a plane.

13. The method of claim 12, wherein the step of moving the workpiece along a plane comprises moving the workpiece along a plane in a direction substantially perpendicular to the direction of flow of the magnetorheological fluid through said clearance.

14. The method of claim 1, wherein said step of moving the workpiece or the zone relative to the other comprises moving the zone by moving the magnetic field relative to said surface adapted to carry magnetorheological fluid.

15. An apparatus for finishing a workpiece surface using magnetorheological fluid, comprising:

a surface for carrying a volume of magnetorheological fluid;

a workpiece holder for holding and positioning the workpiece at a clearance from said surface such that said surface forces a flow of magnetorheological fluid through said clearance;

a magnet for applying a magnetic field at said clearance to create a polishing or work zone in the magnetorheological fluid flowing through said clearance for forming a transient finishing tool for engaging and causing material removal at a portion of the workpiece surface, said zone engaging said workpiece surface at an area smaller than the area of the workpiece surface to be finished; and means for moving the workpiece or the zone relative to the other to expose different portions of the workpiece surface to the zone for predetermined dwell times to selectively finish said portions of said workpiece surface in predetermined degrees.

16. The apparatus of claim 15, wherein at least a portion of said clearance decreases in height from a first section to a second section, and said magnetorheological fluid flows through said clearance in a direction from said first section to said second section.

17. The apparatus of claim 15, wherein said surface for carrying magnetorheological fluid comprises a bottom surface of a rotatable donut-shaped trough configured for recirculating said magnetorheological fluid.

18. The apparatus of claim 17, further comprising means for adding carrier fluid to the magnetorheological fluid to compensate for evaporation of carrier fluid from said magnetorheological fluid.

19. The apparatus of claim 17, further comprising a mixer for stirring the magnetorheological fluid.

20. The apparatus of claim 15, further comprising means for rotating the workpiece relative to the zone.

21. The apparatus of claim 15, wherein said workpiece is mounted on a pivoting workpiece holder to sweep the surface of the workpiece across the zone.

22. The apparatus of claim 15, further comprising means for moving the workpiece along a plane in a direction substantially perpendicular to the direction of flow of magnetorheological fluid through said clearance.

* * * * *